US012364261B2

(12) United States Patent
Goldsmith et al.

(10) Patent No.: US 12,364,261 B2
(45) Date of Patent: *Jul. 22, 2025

(54) LIQUID SULFONYLUREA- AND Li-SALT CONTAINING HERBICIDAL COMPOSITIONS

(71) Applicants: Battelle UK Limited, Chelmsford (GB); Mitsui AgriScience International S.A./N.V., Woluwe-Saint-Pierre (BE)

(72) Inventors: Andrew Goldsmith, Waterlooville (GB); John Groome, Havant (GB)

(73) Assignees: BATTELLE UK LIMITED, Chelmsford (GB); MITSUI AGRISCIENCE INTERNATIONAL S.A./N.V., Woluwe-Saint-Pierre (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,854

(22) Filed: Jul. 26, 2022

(65) Prior Publication Data

US 2022/0378040 A1    Dec. 1, 2022

Related U.S. Application Data

(63) Continuation of application No. 16/087,576, filed as application No. PCT/EP2017/065289 on Jun. 21, 2017, now Pat. No. 11,464,225.

(30) Foreign Application Priority Data

Jun. 21, 2016  (EP) ..................... 16175549
Feb. 16, 2017  (EP) ..................... 17156451

(51) Int. Cl.
    *A01N 25/22*    (2006.01)
    *A01N 25/04*    (2006.01)
    *A01N 47/36*    (2006.01)

(52) U.S. Cl.
CPC ............ *A01N 25/22* (2013.01); *A01N 25/04* (2013.01); *A01N 47/36* (2013.01)

(58) Field of Classification Search
None
See application file for complete search history.

(56) References Cited

U.S. PATENT DOCUMENTS

| | | | |
|---|---|---|---|
| 4,062,889 A | 12/1977 | Eric et al. | |
| 4,599,412 A | 7/1986 | Sandell | |
| 4,690,707 A | 9/1987 | Föry et al. | |
| 4,936,900 A | 6/1990 | Hyson | |
| 6,015,571 A | 1/2000 | Scher et al. | |
| 6,559,098 B1 | 5/2003 | Bratz et al. | |
| 7,867,946 B2 | 1/2011 | Deckwer et al. | |
| 8,501,667 B2 | 8/2013 | Ishihara | |
| 11,071,296 B2 | 7/2021 | Egan et al. | |
| 11,464,225 B2 * | 10/2022 | Goldsmith | ............ A01N 47/36 |

| | | |
|---|---|---|
| 2003/0002279 A1 | 1/2003 | Wysong et al. |
| 2005/0026787 A1 | 2/2005 | Deckwer et al. |
| 2006/0020559 A1 | 9/2006 | Deckwer et al. |
| 2006/0027633 A1 | 12/2006 | Sixl et al. |
| 2011/0007715 A1 | 3/2011 | Sixl et al. |
| 2012/0030962 A1 | 12/2012 | Lee |
| 2014/0029607 A1 | 10/2014 | Bristow |
| 2015/0105259 A1 | 4/2015 | Roechling et al. |
| 2015/0012637 A1 | 5/2015 | Bristow |
| 2018/0000069 A1 | 1/2018 | Egan et al. |
| 2021/0013710 A1 | 5/2021 | Egan et al. |

FOREIGN PATENT DOCUMENTS

| | | |
|---|---|---|
| CA | 2 422 075 A1 | 3/2003 |
| CN | 1159881 A | 9/1997 |
| CN | 1181880 A | 5/1998 |
| CN | 1829441 A | 9/2006 |
| CN | 103987256 A | 8/2014 |
| EP | 0 124 285 A2 | 11/1984 |
| EP | 0 124 295 A2 | 11/1984 |
| EP | 0 554 015 A1 | 3/1995 |
| EP | 1 142 476 A1 | 10/2001 |
| GB | 2 496 643 A | 5/2013 |
| JP | 2000-095620 A | 4/2000 |
| JP | 2007-500144 A | 1/2007 |
| JP | 2007-153870 A | 6/2007 |
| KR | 2010-0015411 A | 2/2010 |
| WO | 91/03937 A1 | 4/1991 |
| WO | 93/22919 A1 | 11/1993 |
| WO | 95/13698 A1 | 5/1995 |
| WO | 98/34482 A1 | 8/1998 |
| WO | 01/70024 A2 | 9/2001 |
| WO | 02/17718 A1 | 3/2002 |
| WO | 02/062138 A2 | 8/2002 |
| WO | 03/051114 A1 | 6/2003 |
| WO | 2004/023876 A1 | 3/2004 |
| WO | 2006/131187 A1 | 12/2006 |
| WO | 2007/018060 A1 | 2/2007 |
| WO | 2013/071582 A1 | 5/2013 |
| WO | 2013/159731 A1 | 10/2013 |
| WO | 2013/174833 A1 | 11/2013 |
| WO | 2016/102499 A1 | 6/2016 |

OTHER PUBLICATIONS

International Search Report and Written Opinion mailed Feb. 19, 2016 in connection with PCT/EP2015/080844.
File history for U.S. Appl. No. 11/435,173, granted as U.S. Pat. No. 7,867,946 on Jan. 1, 2011, 375 pages.
International Search Report and Written Opinion mailed Sep. 11, 2017 in connection with PCT/EP2017/065289.
International Preliminary Report on Patentability mailed Jun. 4, 2018 in connection with PCT/EP2017/065289.

* cited by examiner

*Primary Examiner* — Alton N Pryor
(74) *Attorney, Agent, or Firm* — James S. Keddie; Bozicevic, Field & Francis LLP

(57) ABSTRACT

This invention relates to a liquid herbicidal composition comprising a non-aqueous solvent system, at least one sulfonylurea herbicide and at least one inorganic or $C_1$-$C_{12}$ organic lithium salt. The invention also relates to the use of an inorganic or $C_1$-$C_{12}$ organic lithium salt to improve chemical stabilisation of a sulfonylurea herbicide in a liquid composition comprising a non-aqueous solvent system.

12 Claims, No Drawings

LIQUID SULFONYLUREA- AND Li-SALT CONTAINING HERBICIDAL COMPOSITIONS

CROSS-REFERENCE TO RELATED APPLICATIONS

This application is a continuation of Ser. No. 16/087,576, filed on Sep. 21, 2018, which is a § 371 national phase of International Application No. PCT/EP2017/065289, filed on Jun. 21, 2017, which claims the benefit of European Application No. 16175549.1, filed on Jun. 21, 2016, and European Application No. 17156451.1, filed on Feb. 16, 2017, all of which applications are incorporated by reference herein.

1. FIELD OF THE INVENTION

This invention relates to liquid herbicidal compositions comprising a non-aqueous solvent system, at least one sulfonylurea herbicide and at least one lithium salt as will be described herein. The invention also relates to the use of a lithium salt as will be described herein to improve chemical stabilisation of sulfonylurea herbicides in liquid compositions that comprise non-aqueous solvent systems.

2. BACKGROUND OF THE INVENTION

End-users typically prefer liquid herbicidal compositions over solid compositions because they are easier to handle in measuring, pumping, diluting and dispersing in water, and spraying operations and also generally exhibit superior biological efficacy. Typical liquid formulations include oil-based formulations such as oil dispersions (OD), emulsifiable concentrates (EC), and soluble concentrates (SL) where one or more active ingredients are dissolved in and/or suspended in the liquid media of the formulation.

Sulfonylureas are a well-known and important class of herbicides comprising more than 30 active-ingredients that are widely used for controlling a range of annual and perennial broad-leaved weeds and grasses in a wide variety of agricultural and horticultural crops, as well as in turf, pastures and non-crop situations. However, sulfonylureas are known to be unstable as they have a tendency to hydrolyse via cleavage at the sulfonylurea bridge. While this instability is sometimes considered favourable in terms of achieving low soil residues of these compounds, it poses serious problems commercially with respect to the storage stability of the formulated products. Furthermore, some sulfonylurea herbicides are also prone to degradation due to chemical incompatibilities when other herbicidal ingredients are incorporated in the formulation. This makes the development of liquid formulations that comprise sulfonylurea herbicides and additional herbicidal ingredients even more challenging.

While liquid herbicidal formulations such as oil dispersions have been commercially available for a long time (with early patents dating from the 1980's and 1990's such as GB 2,059,773 and U.S. Pat. No. 5,707,928), the inherent chemical instability of sulfonylurea herbicides has limited their widespread use in liquid formulations. Instead, sulfonylurea compounds are normally formulated as powders, granules and tablets (e.g. see EP 0 764 404 A1, WO 98/34482 A1, WO 93/13658 A1, and WO 02/17718 A1). However, some efforts to stabilise liquid formulations of sulfonylurea herbicides have been described in the art.

For instance, US 2006/0276337 A1 (Bayer CropScience GmbH) describes an oil suspension concentrate comprising one or more pyridylsulfonylurea compounds suspended in one or more organic solvents optionally with a sulfosuccinate salt. The oil suspensions are reported to be storage-stable but no quantitative measurement regarding stability is provided. WO 2005/011382 A1 (Bayer CropScience GmbH) reports that inorganic salts can be used to stabilise sulfonylureas in a liquid formulation.

WO 2007/027863 A2 (E.I. du Pont de Nemours & Co.) is also concerned with providing stable sulfonylurea-containing liquid compositions and describes an oil suspension concentrate comprising one or more sulfonylurea herbicides, additionally one or more fatty acid esters of C1-C4 alkanols, and a lignosulfonate. The stability of these compositions was found to vary dependent on the sulfonylurea that was used. Although the document is concerned with providing stable compositions, up to 66.5% of tribenuron-methyl was lost after only one week of storage at 40° C.

U.S. Pat. No. 5,731,264 (ISP Investments Inc.) describes a liquid emulsifiable concentrate comprising a sulfonylurea and a mixture of anionic and non-ionic surfactants dissolved in a solvent selected from gamma-butyrolactone, propylene glycol or propylene carbonate or mixtures thereof. The obtained formulations, comprising metsulfuron-methyl which is considered to be of average stability, are reported to have a half-life of 5.8 days at 52° C. After 5 days, between 25-30% of the metsulfuron methyl was lost depending on the selected solvent.

WO 2008/155108 A2 (GAT Microencapsulation AG) describes oil suspensions of sulfonylureas and organomodified silane compounds that are reportedly stable when stored at comparatively gentle accelerated storage conditions of 35° C. for 15 days. In WO 2009/152827 A2 (also GAT Microencapsulation AG) the more usual accelerated storage conditions of 54° C. for two weeks are used but in this document the chemical stability of the sulfonylurea in the suspension concentrates is not reported.

EP 0554015 A1 (Ishihara Sangyo Kaisha, Ltd.) describes a chemically stabilized herbicidal oil-based suspension, comprising N-[(4,6-dimethoxypyrimidin-2-yl) aminocarbonyl-3-dimethylaminocarbonyl-2-pyridinesulfonamide and/or its salt as an effective herbicidal component, urea, a vegetable oil and/or mineral oil, a surfactant and, optionally other ingredients such as an additional herbicidal component, a thickener, a solvent and other adjuvants. According to that document, urea is added to suppress decomposition of the effective herbicidal component and to provide a chemically stabilized herbicidal oil-based suspension.

GB 2496643 A (Rotam Agrochem International Company Ltd.) aims to improve the suspension concentrate described in EP 0554015 A1. This document is concerned with pyridine sulfonamides (i.e. pyridylsulfonylureas) and teaches to add a polyether-polysiloxane to the composition to counteract supposed poor spreading and water dispersibility caused by the addition of urea or other stabilizers to a suspension concentrate.

EP 0 124 295 A2 (E.I. du Pont de Nemours & Co.) reports that aqueous suspensions of sulfonylureas can be stabilized by the presence of ammonium, substituted ammonium or alkali metal salts of carboxylic acid or inorganic acid provided that the salts exhibit specific solubility and pH properties. Exemplary salts are said to be diammonium hydrogen phosphate, ammonium acetate, lithium acetate, sodium acetate, potassium acetate, or sodium thiocyanate.

WO 03/051114 A1 (ISP Investments Inc.) is concerned with increasing the shelf-life of an oil-in-water microemulsion containing a biologically active aza type compound. The oil-in-water microemulsion contains from 90 to 99.99 wt. % water. Shelf-life is said to be extended by the addition of a buffering agent to the emulsion. The buffering agent is an alkaline buffering agent such as an inorganic Na, K and or $NH_4$ salt of a phenol, a polyphenol or a weak acid; an alkanol amine; a polyamine salt of a weak acid or a mixture of these buffering agents. No stability data is provided for any sulfonylurea-containing formulations.

WO 2013/174833 A1 (Bayer CropScience AG) describes an oil dispersion formulation of iodosulfuron-methyl sodium salt which comprise hydroxystearates, in particular lithium hydroxystearate as both a thickener and a stabilizer for the sulfonylurea.

U.S. Pat. No. 4,599,412 A describes a process for the preparation of homogeneous solution formulations of sulfonylureas with reportedly improved chemical stability, by contacting said solutions with molecular sieves.

Despite the available art described above, only a few active ingredients in the sulfonylurea family have been incorporated into commercially successful liquid formulations. Despite their lengthy presence in the market, there are still no commercially successful oil-based liquid formulations of many important sulfonylureas including chlorimuron-ethyl, metsulfuron-methyl, triflusulfuron-methyl, tribenuron-methyl, thifensulfuron-methyl, chlorimuron-ethyl, rimsulfuron and sulfosulfuron. There is a clear need for an improved formulation system to reliably deliver liquid formulations of improved chemical stability for a broader range of sulfonylureas and for co-formulated mixtures of sulfonylureas with non-sulfonylurea herbicides.

3. SUMMARY OF THE INVENTION

The present invention is based on the surprising finding that the chemical stability of many sulfonylureas in a liquid composition comprising a non-aqueous solvent system can be improved by incorporating into the composition at least one inorganic or organic lithium salt, wherein the organic lithium salt is selected from the $C_1$-$C_{12}$ carboxylic acid salts of lithium.

Accordingly, the present invention relates to liquid herbicidal compositions comprising: a non-aqueous solvent system; at least one sulfonylurea herbicide; and at least one inorganic or organic lithium salt, wherein the at least one organic lithium salt is selected from the $C_1$-$C_{12}$ organic carboxylic acid salts of lithium. Preferably, the inorganic and $C_1$-$C_{12}$ organic acid salt has a molecular weight of 250 or less. Preferably, the $C_1$-$C_{12}$ organic carboxylic acids are mono or dicarboxylic acids. In one embodiment of the invention the $C_1$-$C_{12}$ organic carboxylic acid salt is selected from lithium acetate, lithium formate, lithium citrate, lithium succinate, lithium octanoate, and lithium benzoate. In a further embodiment of the invention the inorganic acid salt of lithium is selected from lithium carbonate, lithium sulfate, lithium phosphate, lithium chloride, lithium iodide, lithium bromide, lithium nitrate, and lithium borate. The present invention is suitable for chemically stabilising liquid compositions comprising one, two, three, four or more different sulfonylurea compounds.

The liquid herbicidal composition is preferably formulated as an oil dispersion (OD), a dispersible concentrate (DC), an emulsifiable concentrate (EC), or a soluble concentrate (SL). At least one sulfonylurea is dissolved, suspended or otherwise contained in the non-aqueous solvent system. At least one inorganic or organic lithium salt as described herein is dissolved, suspended or otherwise contained in the non-aqueous solvent system.

The liquid herbicidal composition of the invention may comprise one or more non-sulfonylurea herbicides that are suspended, dissolved or otherwise contained in the non-aqueous solvent system. The present invention is particularly suitable for improving the chemical stability of a sulfonylurea in the presence of a non-sulfonylurea herbicide that would ordinarily impair its chemical stability.

The liquid herbicidal composition may comprise one or more safeners. The liquid herbicidal composition may also comprise co-formulants such as surfactants, particularly non-ionic surfactants.

The invention also relates to the use of a lithium salt to improve chemical stabilisation of a sulfonylurea herbicide in a liquid composition comprising a non-aqueous solvent system, wherein the lithium salt is an inorganic lithium salt or an organic lithium salt selected from the $C_1$-$C_{12}$ organic carboxylic acid salts of lithium.

4. DETAILED DESCRIPTION OF THE INVENTION

4.1 General Remarks

As used herein, the terms "comprises", "comprising", "includes", "including", "has", "having" or any other variation thereof, are intended to cover a non-exclusive inclusion. For example, a composition that comprises a list of components is not necessarily limited to only those components but may include other components that are not expressly listed or inherent to such a composition. That said, the terms "comprises", "comprising", "includes", "including", "has", "having" or any other variation thereof also cover the disclosed embodiment having no further additional components (i.e. consisting of those components). By way of example, a composition comprising a sulfonylurea, a lithium salt, an organic solvent, and a surfactant discloses the composition with just these four components as well as compositions comprising these four components along with other unmentioned components.

Also, the indefinite articles "a" and "an" preceding an element or component of the invention are intended to be non-restrictive regarding the number of instances (i.e. occurrences) of the element or component. Therefore "a" or "an" should be read to include one or at least one, and the singular word form of the element or component also includes the plural unless the number is obviously meant to be singular. By way of example, reference to a composition comprising a surfactant should be understood to mean that the composition comprises one or at least one surfactant unless specified otherwise.

Further, when an aspect of the invention is described as being 'preferred', it should be understood that this preferred aspect of the invention can be combined with other preferred aspects of the invention. By way of example, if iodosulfuron-methyl is described as being a preferred sulfonylurea, and isobornyl acetate is described as being a preferred organic solvent, and lithium acetate is described as being a preferred salt, then the present disclosure should be taken to also be a disclosure of a composition incorporating these preferred components.

4.2 Liquid Composition

The herbicidal composition of the invention is a liquid. By "liquid" is meant that the composition takes the form of a liquid at standard temperature and pressure. Suitable liquid compositions that can be used in the present invention include the oil-based liquid formulations defined in the "Catalogue of pesticide formulation types and international coding system", Technical Monograph No. 2, 6th Ed. May 2008, CropLife International. Exemplary liquid compositions for use in the present invention include a dispersible concentrate (DC), an emulsifiable concentrate (EC), the liquid part(s) of a solid/liquid (KK) or liquid/liquid (KL) combi-pack, an oil dispersion (OD), an oil miscible flowable concentrate (OF), an oil miscible liquid (OL), an oil-based soluble concentrate (SL), a spreading oil (SO), an oil-based ultra-low volume liquid (UL) or suspension (SU), or any other oil-based liquid not yet designated by a specific code in the CropLife monograph (AL). Of these, oil dispersions (OD), dispersible concentrates (DC), emulsifiable concentrates (EC), and oil-based soluble concentrates (SL) are preferred. These and other formulations are known in the art and are described, for example, in "Pesticide Formulations" (1973) by Wade van Valkenburg, and "New Trends in Crop Protection Formulations" (2013) edited by Alan Knowles.

The invention is particularly suited to improving the chemical stability of sulfonylureas in oil dispersions (OD), emulsifiable concentrates (EC), and soluble concentrates (SL). Accordingly, these types of formulation are the most preferred for the present invention. The term "oil dispersion" is to be understood as meaning a dispersion concentrate based on a non-aqueous solvent in which one or more solid active compounds are suspended and wherein further active ingredients are optionally dissolved in the non-aqueous solvent. In one embodiment at least one sulfonylurea compound is suspended in the non-aqueous solvent system. Additional sulfonylurea compounds may be co-suspended and/or dissolved in the non-aqueous solvent system. In addition to the one or more sulfonylurea compounds, one or more non-sulfonylurea herbicidal compounds may be suspended and/or dissolved in the non-aqueous solvent system. Preferably the inorganic or $C_1$-$C_{12}$ organic lithium salt is also suspended in the non-aqueous solvent system.

In the absence of any indication to the contrary, the terms "suspended" and "dissolved" take their ordinary meaning in this technical field. Whether a compound is suspended or dissolved can be determined at standard temperature and pressure. For the avoidance of any doubt, the term "suspended" can be taken to mean that 80 wt. % or more, preferably 90 wt. % or more, even more preferably 95 wt. % or more of the compound in question is suspended within the liquid composition whereas the term "dissolved" can be taken to mean that 90 wt. % or more, preferably 95 wt. % or more, even more preferably 99 wt. % or more of the compound in question is dissolved in the liquid composition.

4.3 Sulfonylurea

The liquid composition of the present invention comprises a sulfonylurea. The sulfonylurea is not particularly limited and can be any herbicidal sulfonylurea known in the art or described in the patent literature. For example, the sulfonylurea may be selected from the sulfonylureas listed in the 16$^{th}$ Edition of "The Pesticide Manual" (ISBN-10: 190139686X). By way of a general structure, the sulfonylurea may be a compound according to Formula (I) as described in WO 2007/027863 A2 (E.I. DuPont De Nemours and Company):

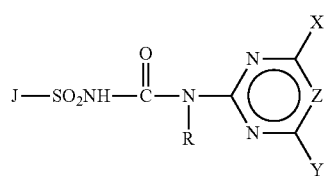

Formula (1)

wherein J is $R^{13}SO_2N(CH_3)$— or J is selected from the group consisting of

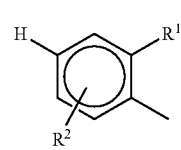

J-1

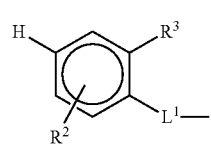

J-2

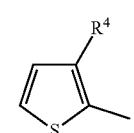

J-3

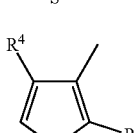

J-4

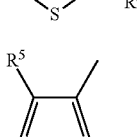

J-5

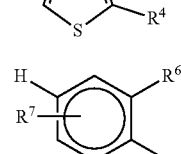

J-6

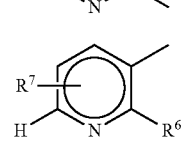

J-7

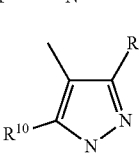

J-8

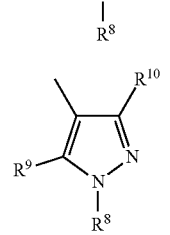

J-9

-continued

J-10
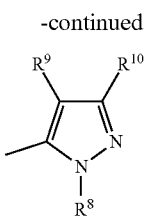

J-11
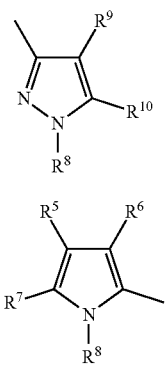

J-12

J-13
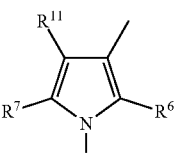

J-14
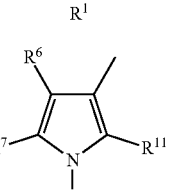

J-15
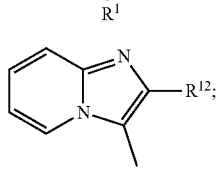

and wherein:

R is H or $CH_3$;

$R^1$ is F, Cl, Br, $NO_2$, $C_1$-$C_4$ alkyl, $C_1$-$C_4$ haloalkyl, $C_3$-$C_4$ cycloalkyl, $C_2$-$C_4$ haloalkenyl, $C_1$-$C_4$ alkoxy, $C_1$-$C_4$ haloalkoxy, $C_2$-$C_4$ alkoxyalkoxy, $CO_2R^{14}$, $C(O)NR^{15}R^{16}$, $SO2NR^{17}R^{18}$, $S(O)_nR^{19}$, $C(O)R^{20}$, $CH_2CN$ or L;

$R^2$ is H, F, Cl, Br, I, CN, $CH_3$, $OCH_3$, $SCH_3$, $CF_3$ or $OCF_2H$;

$R^3$ is Cl, $NO_2$, $CO_2CH_3$, $CO_2CH_2CH_3$, $C(O)CH_3$, $C(O)CH_2CH_3$, C(O)-cyclopropyl, $SO_2N(CH_3)_2$, $SO_2CH_3$, $SO_2CH_2CH_3$, $OCH_3$ or $OCH_2CH_3$;

$R^4$ is $C_1$-$C_3$ alkyl, $C_1$-$C_2$ haloalkyl, $C_1$-$C_2$ alkoxy, $C_2$-$C_4$ haloalkenyl; F, Cl, Br, $NO_2$, $CO_2R_{14}$, $C(O)NR_{15}R_{16}$, $SO_2NR_{17}R_{18}$, $S(O)nR_{19}$, $C(O)R_{20}$ or L;

$R^5$ is H, F, Cl, Br or $CH_3$;

$R^6$ is $C_1$-$C_3$ alkyl optionally substituted with 0-3 F, 0-1 Cl and 0-1 $C_3$-$C_4$ alkoxyacetyloxy, or $R^6$ is $C_1$-$C_2$ alkoxy, $C_2$-$C_4$ haloalkenyl, F, Cl, Br, $CO_2R^{14}$, $C(O)NR^{15}R^{16}$, $SO_2NR^{17}R^{18}$, $S(O)_nR^{19}$, $C(O)R^{20}$ or L;

$R^7$ is H, F, Cl, $CH_3$ or $CF_3$;

$R^8$ is H, $C_1$-$C_3$ alkyl or pyridyl;

$R^9$ is $C_1$-$C_3$ alkyl, $C_1$-$C_2$ alkoxy, F, Cl, Br, $NO_2$, $CO_2R^{14}$, $SO_2NR^{17}R^{18}$, $S(O)_nR^{19}$, $OCF_2H$, $C(O)R^{20}$, $C_2$-$C_4$ haloalkenyl or L;

$R^{10}$ is H, Cl, F, Br, $C_1$-$C_3$ alkyl or $C_1$-$C_2$ alkoxy;

$R^{11}$ is H, $C_1$-$C_3$ alkyl, $C_1$-$C_2$ alkoxy, $C_2$-$C_4$ haloalkenyl, F, Cl, Br, $CO_2R^{14}$, $C(O)NR^{15}R^{16}$, $SO_2NR^{17}R^{18}$, $S(O)_nR^{19}$, $C(O)R^{20}$ or L;

$R^{12}$ is halogen, $C_1$-$C_4$ alkyl or $C_1$-$C_3$ alkylsulfonyl;

$R^{13}$ is $C_1$-$C_4$ alkyl;

$R^{14}$ is selected from the group consisting of allyl, propargyl, oxetan-3-yl and $C_1$-$C_3$ alkyl optionally substituted by at least one member independently selected from halogen, $C_1$-$C_2$ alkoxy and CN;

$R^{15}$ is H, $C_1$-$C_3$ alkyl or $C_1$-$C_2$ alkoxy;

$R^{16}$ is $C_1$-$C_2$ alkyl;

$R^{17}$ is H, $C_1$-$C_3$ alkyl, $C_1$-$C_2$ alkoxy, allyl or cyclopropyl;

$R^{18}$ is H or $C_1$-$C_3$ alkyl;

$R^{19}$ is $C_1$-$C_3$ alkyl, $C_1$-$C_3$ haloalkyl, allyl or propargyl;

$R^{20}$ is $C_1$-$C_4$ alkyl, $C_1$-$C_4$ haloalkyl or $C_3$-$C_5$ cycloalkyl optionally substituted by halogen;

n is 0, 1 or 2;

L is

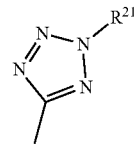

$L^1$ is $CH_2$, NH or O;

$R^{21}$ is selected from the group H and $C_1$-$C_3$ alkyl;

X is selected from the group H, $C_1$-$C_4$ alkyl, $C_1$-$C_4$ alkoxy, $C_1$-$C_4$ haloalkoxy, $C_1$-$C_4$ haloalkyl, $C_1$-$C_4$ haloalkylthio, $C_1$-$C_4$ alkylthio, halogen, $C_2$-$C_5$ alkoxyalkyl, $C_2$-$C_5$ alkoxyalkoxy, amino, $C_1$-$C_3$ alkylamino and di($C_1$-$C_3$ alkyl) amino;

Y is selected from the group H, $C_1$-$C_4$ alkyl, $C_1$-$C_4$ alkoxy, $C_1$-$C_4$ haloalkoxy, $C_1$-$C_4$ alkylthio, $C_1$-$C_4$ haloalkylthio, $C_2$-$C_5$ alkoxyalkyl, $C_2$-$C_5$ alkoxyalkoxy, amino, $C_1$-$C_3$ alkylamino, di($C_1$-$C_3$ alkyl)amino, $C_3$-$C_4$ alkenyloxy, $C_3$-$C_4$ alkynyloxy, $C_2$-$C_5$ alkylthioalkyl, $C_2$-$C_5$ alkylsulfinylalkyl, $C_2$-$C_5$ alkylsulfonylalkyl, $C_1$-$C_4$ haloalkyl, $C_2$-$C_4$ alkynyl, $C_3$-$C_5$ cycloalkyl, azido and cyano; and Z is selected from the group CH and N;

provided that (i) when one or both of X and Y is Cl haloalkoxy, then Z is CH; and (ii) when X is halogen, then Z is CH and Y is $OCH_3$, $OCH_2CH_3$, $N(OCH_3)CH_3$, $NHCH_3$, $N(CH_3)_2$ or $CF_2H$.

In Formula (I) above, the term "alkyl", used either alone or in compound words such as "alkylthio" or "haloalkyl" includes a straight-chain or branched alkyl, such as, methyl, ethyl, n-propyl, i-propyl, or the different butyl isomers; "cycloalkyl" includes, for example, cyclopropyl, cyclobutyl and cyclopentyl; "alkenyl" includes straight-chain or branched alkenes such as ethenyl, 1-propenyl, 2-propenyl, and the different butenyl isomers; "alkenyl" also includes polyenes such as 1,2-propadienyl and 2,4-butadienyl; "alkynyl" includes straight-chain or branched alkynes such as ethynyl, 1-propynyl, 2-propynyl and the different butynyl isomers;

"alkynyl" can also include moieties comprised of multiple triple bonds such as 2,5-hexadiynyl; "alkoxy" includes, for example, methoxy, ethoxy, n-propyloxy, isopropyloxy and the different butoxy isomers; "alkoxyalkyl" denotes alkoxy substitution on alkyl and examples include $CH_3OCH_2$, $CH_3OCH_2CH_2$, $CH_3CH_2OCH_2$, $CH_3CH_2CH_2OCH_2$ and $CH_3CH_2OCH_2CH_2$; "alkoxyalkoxy" denotes alkoxy substitution on alkoxy; "alkenyloxy" includes straight-chain or branched alkenyloxy moieties and examples include H$_2$C=CHCH$_2$O, (CH$_3$)CH=CHCH$_2$O and CH$_2$=CHCH$_2$CH$_2$O; "alkynyloxy" includes straight-chain or branched alkynyloxy moieties and examples include HCCCH$_2$O and CH$_3$CCCH$_2$O; "alkylthio" includes branched or straight-chain alkylthio moieties such as methylthio, ethylthio, and the different propylthio isomers; "alkylthioalkyl" denotes alkylthio substitution on alkyl and examples include CH$_3$SCH$_2$, CH$_3$SCH$_2$CH$_2$, CH$_3$CH$_2$SCH$_2$, CH$_3$CH$_2$CH$_2$CH$_2$SCH$_2$ and CH$_3$CH$_2$SCH$_2$CH$_2$; "alkylsulfinylalkyl" and "alkylsulfonylalkyl" include the corresponding sulfoxides and sulfones, respectively; other substituents such as "alkylamino", "dialkylamino" are defined analogously.

In Formula (I) above the total number of carbon atoms in a substituent group is indicated by the "Ci-Cj" prefix where i and j are numbers from 1 to 5. For example, C$_1$-C$_4$ alkyl designates methyl through butyl, including the various isomers. As further examples, C$_2$ alkoxyalkyl designates CH$_3$OCH$_2$; C$_3$ alkoxyalkyl designates, for example, CH$_3$CH (OCH$_3$), CH$_3$OCH$_2$CH$_2$ or CH$_3$CH$_2$OCH$_2$; and C$_4$ alkoxyalkyl designates the various isomers of an alkyl group substituted with an alkoxy group containing a total of four carbon atoms, examples including CH$_3$CH$_2$CH$_2$OCH$_2$ and CH$_3$CH$_2$OCH$_2$CH$_2$.

In Formula (I) the term "halogen", either alone or in compound words such as "haloalkyl", includes fluorine, chlorine, bromine or iodine. Further, when used in compound words such as "haloalkyl", said alkyl may be partially or fully substituted with halogen atoms which may be the same or different. Examples of "haloalkyl" include F$_3$C, ClCH$_2$, CF$_3$CH$_2$ and CF$_3$CCl$_2$. The terms "haloalkoxy", "haloalkylthio", and the like, are defined analogously to the term "haloalkyl". Examples of "haloalkoxy" include CF$_3$O, CCl$_3$CH$_2$O, HCF$_2$CH$_2$CH$_2$O and CF$_3$CH$_2$O. Examples of "haloalkylthio" include CCl$_3$S, CF$_3$S, CCl$_3$CH$_2$S and ClCH$_2$CH$_2$CH$_2$S.

For this invention, preferable sulfonylureas according to Formula (I) include those where X is selected from the group C$_1$-C$_4$ alkyl, C$_1$-C$_4$ alkoxy, C$_1$-C$_4$ haloalkoxy, halogen, di(C$_1$-C$_3$ alkyl)amino and Y is selected from the group C$_1$-C$_4$ alkyl, C$_1$-C$_4$ alkoxy, and C$_1$-C$_4$ haloalkoxy. More preferably, X is selected from CH$_3$, OCH$_3$, Cl, OCHF$_2$, and N(CH$_3$)$_2$ and Y is selected from CH$_3$, OCH$_3$, OCHF$_2$ and OCH$_2$CF$_3$.

Preferable sulfonylureas according to Formula (I) also include those where J is J-1, R$^1$ is Cl, CO$_2$CH$_3$, CO$_2$C$_2$H$_5$, CH$_2$CH$_2$CF$_3$, or OCH$_2$CH$_2$Cl, and R$^2$ is H; J is J-1, R$^1$ is CO$_2$CH$_3$, and R$^2$ is CH$_3$; J is J-2, R$^3$ is CO$_2$C$_2$H$_5$, OCH$_2$CH$_3$, or COC$_3$-cycloalkyl, L$^1$ is CH$_2$, O, or NH, and R$^2$ is H; J is J-5, R$^4$ is CO$_2$CH$_3$, and R$^5$ is H; J is J-6, R$^6$ is CON(CH$_3$)$_2$, SO$_2$CH$_2$CH$_3$, or CF$_3$, and R$^7$ is H; J is J-10, R$^8$ is CH$_3$, R$^9$ is CO$_2$CH$_3$ and R$^{10}$ is Cl.

For the purpose of this invention, the sulfonylurea according to Formula (I), or any of the exemplary sulfonylureas mentioned herein, is to be understood as meaning all of the usual use forms in this technical field, such as acids, esters, salts and isomers. In this invention the salt includes acid-addition salts with inorganic or organic acids such as hydrobromic, hydrochloric, nitric, phosphoric, sulfuric, acetic, butyric, fumaric, lactic, maleic, malonic, oxalic, propionic, salicylic, tartaric, 4-toluenesulfonic or valeric acids. Also included are salts formed with organic bases (e.g., pyridine, ammonia, or triethylamine) or inorganic bases (e.g., hydrides, hydroxides, or carbonates of sodium, potassium, lithium, calcium, magnesium or barium). Preferred salts of the sulfonylureas according to Formula (I), or the exemplary sulfonylureas mentioned herein, include lithium, sodium, potassium, triethylammonium, and quaternary ammonium salts. Preferred esters for the purpose of this invention are the alkyl esters, in particular the C$_1$-C$_{10}$-alkyl esters, such as methyl and ethyl esters.

Exemplary sulfonylureas according to Formula (I) that can be used for this invention include:
amidosulfuron (N-[[[[(4,6-dimethoxy-2-pyrimdinyl) amino]carbonyl]amino]sulfonyl]-N-methylmethane-sulfonamide),
azimsulfuron (N-[[(4,6-dimethoxy-2-pyrimidinyl) amino]-carbonyl]-1-methyl-4-(2-methyl-2H-tetrazol-5-yl)-1H-pyrazole-5-sulfonamide),
bensulfuron-methyl (methyl 2-[[[[[(4,6-dimethoxy-2-pyrimidinyl)amino]carbonyl]amino]-sulfonyl]methyl] benzoate),
chlorimuron-ethyl (ethyl 2-[[[[(4-chloro-6-methoxy-2-pyrimidinyl)amino]carbonyl]amino]sulfonyl]benzoate),
chlorsulfuron (2-chloro-N-[[(4-methoxy-6-methyl-1,3,5-triazin-2-yl)amino]carbonyl]benzenesulfonamide),
cinosulfuron (N-[[(4,6-dimethoxy-1,3,5-triazin-2-yl) amino]carbonyl]-2-(2-methoxyethoxy)-benzenesulfonamide),
cyclosulfamuron (N-[[[2-(cyclopropylcarbonyl)phenyl] amino]-sulfonyl]-N$^1$-(4,6-dimethoxypyrimidin-2-yl) urea),
ethametsulfuron-methyl (methyl 2-[[[[[4-ethoxy-6-(methylamino)-1,3,5-triazin-2-yl]amino]carbonyl]amino]-sulfonyl]benzoate),
ethoxysulfuron (2-ethoxyphenyl [[(4,6-dimethoxy-2-pyrimidinyl)-amino]carbonyl]sulfamate),
flazasulfuron (N-[[(4,6-dimethoxy-2-pyrimidinyl)amino] carbonyl]-3-(trifluoromethyl)-2-pyridinesulfonamide),
flucetosulfuron (1-[3-[[[[(4,6-dimethoxy-2-pyrimidinyl)-amino]carbonyl]amino]sulfonyl]-2-pyridinyl]-2-fluoropropyl methoxyacetate),
flupyrsulfuron-methyl ((methyl 2-[[[[(4,6-dimethoxy-2-pyrimidinyl)amino]carbonyl]amino]sulfonyl]-6-(trifluoromethyl)-3-pyridinecarboxylate),
foramsulfuron (2-[[[[(4,6-dimethoxy-2-pyrimidinyl) amino]carbonyl]amino]sulfonyl]-4-(formylamino)-N, N-dimethylbenzamide),
halosulfuron-methyl (methyl 3-chloro-5-[[[[(4,6-dimethoxy-2-pyrimidinyl)amino]carbonyl]amino]sulfonyl]-1-methyl-1H-pyrazole-4-carboxylate),
imazosulfuron (2-chloro-N-[[(4,6-dimethoxy-2-pyrimidinyl)amino]-carbonyl]imidazo[1,2-a]pyridine-3-sulfonamide),
iodosulfuron-methyl (methyl 4-iodo-2-[[[[(4-methoxy-6-methyl-1,3,5-triazin-2-yl)amino]carbonyl]amino] sulfonyl]benzoate),
iofensulfuron (2-iodo-N-[[(4-methoxy-6-methyl-1,3,5-triazin-2-yl)amino]carbonyl]benzenesulfonamide),
mesosulfuron-methyl (methyl 2-[[[[(4,6-dimethoxy-2-pyrimidinyl)amino]carbonyl]amino]-sulfonyl]-4-[[(methylsulfonyl)amino]methyl]benzoate),
metazosulfuron (3-chloro-4-(5,6-dihydro-5-methyl-1,4,2-dioxazin-3-yl)-N-[[(4,6-dimethoxy-2-pyrimidinyl) amino]carbonyl]-1-methyl-1H-pyrazole-5-sulfonamide),
metsulfuron-methyl (methyl 2-[[[[(4-methoxy-6-methyl-1,3,5-triazin-2-yl)amino]carbonyl]amino]sulfonyl] benzoate),
nicosulfuron (2-[[[[(4,6-dimethoxy-2-pyrimidinyl)amino] carbonyl]amino]sulfonyl]-N,N-dimethyl-3-pyridinecarboxamide), orthosulfamuron (2-[[[[[(4,6-dimethoxy-2-pyrimidinyl) amino]carbonyl]amino]sulfonyl]amino]-N,N-dimethylbenzamide), oxasulfuron (3-oxetanyl 2-[[[[(4,6-dimethyl-2-pyrimidinyl)amino]carbonyl]amino]sulfonyl]benzoate), primisulfuron-methyl (methyl 2-[[[[[4,6-bis(trifluoromethoxy)-2-pyrimidinyl]amino]carbonyl]amino] sulfonyl]benzoate), prosulfuron (N-[[(4-methoxy-6-methyl-1,3,5-triazin-2-yl)amino]carbonyl]-2-(3,3,3-trifluoropropyl)benzenesulfonamide), pyrazosulfuron-ethyl (ethyl 5-[[[[(4,6-dimethoxy-2-pyrimidinyl)amino]carbonyl]amino]sulfonyl]-1-methyl-1H-pyrazole-4-carboxylate), rimsulfuron (N-[[(4,6-dimethoxy-2-pyrimidinyl)amino] carbonyl]-3-(ethylsulfonyl)-2-pyridinesulfonamide), sulfometuron-methyl (methyl 2-[[[[(4,6-dimethyl-2-pyrimidinyl)amino]carbonyl]amino]sulfonyl]-benzoate), sulfosulfuron (N-[[(4,6-dimethoxy-2-pyrimidinyl)amino] carbonyl]-2-(ethylsulfonyl)imidazo[1,2-a]pyridine-3-sulfonamide), thifensulfuron-methyl (methyl 3-[[[[(4-methoxy-6-methyl-1,3,5-triazin-2-yl)amino]carbonyl]amino] sulfonyl]-2-thiophenecarboxylate), triasulfuron (2-(2-chloroethoxy)-N-[[(4-methoxy-6-methyl-1,3,5-triazin-2-yl)amino]carbonyl]benzenesulfonamide), tribenuron-methyl (methyl 2-[[[[N-(4-methoxy-6-methyl-1,3,5-triazin-2-yl)-N-methylamino]carbonyl]amino]-sulfonyl]benzoate), trifloxysulfuron (N-[[(4,6-dimethoxy-2-pyrimidinyl) amino]carbonyl]-3-(2,2,2-trifluoroethoxy)-2-pyridinesulfonamide), triflusulfuron-methyl (methyl 2-[[[[[4-dimethylamino)-6-(2,2,2-trifluoroethoxy)-1,3,5-triazin-2-yl]amino]carbonyl]amino]-sulfonyl]-3-methylbenzoate) and tritosulfuron (N-[[[4-methoxy-6-(trifluoromethyl)-1,3,5-triazin-2-yl]amino]carbonyl]-2-(trifluoromethyl)benzenesulfonamide).

Other sulfonylureas (e.g. propyrisulfuron: 2-chloro-N-[[(4,6-dimethoxy-2-pyrimidinyl)amino]carbonyl]-6-propylimidazo[1,2-b]pyridazine-3-sulfonamide) that are mentioned in the art (e.g. WO 2014/018410 A1 (Dow Agrosciences; WO 2012/175899 A1 (Syngenta Ltd.)) can also be used for this invention.

Preferred salts of the sulfonylureas mentioned above include the sodium salt thereof and the potassium salt thereof.

The sulfonylurea is preferably comprised in the liquid compositions of the invention in an amount of at least 0.1 wt. % based on the total weight of the liquid composition. More preferably, the sulfonylurea is comprised in an amount of at least 0.2 wt. %, at least 0.5 wt. %, at least 0.7 wt. %, at least 1 wt. %, at least 2 wt. %, at least 5 wt. % or at least 7 wt. %. Increasing the amount of sulfonylurea can improve its chemical stability. The sulfonylurea is preferably comprised in the composition in an amount of 60 wt. % or less. More preferably, the sulfonylurea is comprised in an amount of 50 wt. % or less, 40 wt. % or less, 30 wt. % or less, 25 wt. % or less, 20 wt. % or less, 10 wt. % or less, 5 wt. % or less, 2 wt. % or less, or 1 wt. % or less. Any of the preferred lower wt. % limits for the amount of sulfonylurea can be combined with any of the preferred upper wt. % limits to define further suitable wt. % ranges for the present invention. As an example, further exemplary ranges for the amount of sulfonylurea in the liquid composition include 0.1 to 60 wt. %, 1 to 50wt. %, 2 to 40 wt. %, 5 to 30 wt. %, 0.5 to 20 wt. %, 7 to 30 wt. %, 5 to 10 wt. %, 0.2 to 5 wt. %, 0.5 to 2 wt. % and 0.5 to 1 wt. %.

When the sulfonylurea is used in a modified form such as its salt, ester or otherwise then the wt. % amounts that are described herein refer to the weight amount of the modified sulfonylurea. When more than one sulfonylurea is present in the composition (as the salt, ester or otherwise), then the amounts described herein refer to the sum amount of all the sulfonylureas present in the composition.

When the liquid composition is an oil dispersion of a sulfonylurea, then it is preferable that the sulfonylurea has a particle size (D50) of at least 100 nm or more, at least 200 nm or more, at least 500 nm or more, at least 1 µm or more, at least 2 µm or more, or at least 3 µm or more as a particle size less than this can generate excess heat during milling and possibly degrade the sulfonylurea. Preferably, the sulfonylurea has a particle size (D50) of 30 µm or less, 15 µm or less, 10 µm or less, 7 µm or less, 5 µm or less, 3 µm or less, 1 µm or less, 500 nm or less. Any of the preferred lower limits for the sulfonylurea particle size can be combined with any of the preferred upper limits to define further suitable particle size ranges for the present invention. As an example, further exemplary ranges for the particle size (D50) of the sulfonylurea include 0.1-30 µm, 0.2-15 µm, 0.5-10 µm, 0.1-0.5 µm, 0.2-1 µm, 0.5-3 µm, 1-15 µm, 1-10 µm, 1-7 µm, 2-15 µm, 2-10 µm, 2-7 µm, 3-15 µm, 3-10 µm, and 3-7 µm. D50 refers to the volume median particle size and can be determined by laser light scattering using the method described in CIPAC MT187.

The liquid composition of the invention may comprise more than one sulfonylurea herbicide compound. The liquid composition may comprise any combination of sulfonylureas as disclosed herein. For example, the liquid composition may comprise tribenuron-methyl and any other sulfonylurea described herein; the liquid composition may comprise metsulfuron-methyl and any other sulfonylurea described herein; the liquid composition may comprise nicosulfuron and any other sulfonylurea described herein; the liquid composition may comprise iodosulfuron and any other sulfonylurea described herein; or the liquid composition may comprise halosulfuron-methyl and any other sulfonylurea described herein. Further exemplary combinations of sulfonylureas for use in the present invention include: amidosulfuron and iofensulfuron (optionally as the sodium salt); nicosulfuron and rimsulfuron; nicosulfuron and thifensulfuron methyl; nicosulfuron and prosulfuron; metsulfuron methyl and iodosulfuron methyl (optionally as the sodium salt); metsulfuron methyl and sulfosulfuron; metsulfuron methyl and thifensulfuron methyl; metsulfuron methyl and bensulfuron methyl; metsulfuron methyl and chlorsulfuron; metsulfuron methyl and chlorimuron ethyl; metsulfuron methyl and tribenuron-methyl; tribenuron-methyl and bensulfuron-methyl; tribenuron-methyl and thifensulfuron methyl; metsulfuron methyl, tribenuron-methyl and thifensulfuron methyl; tribenuron-methyl and chlorimuron ethyl; tribenuron-methyl and mesosulfuron (optionally as mesosulfuron methyl); tribenuron-methyl and iodosulfuron-methyl (optionally as the sodium salt); iodosulfuron methyl (optionally as the sodium salt) and mesosulfuron; iodosulfuron methyl (optionally as the sodium salt) and mesosulfuron methyl; iodosulfuron methyl (optionally as the sodium salt) and amidosulfuron; iodosulfuron methyl (optionally as the sodium salt) and foramsulfuron; iofensulfuron (optionally as the sodium salt) and iodosulfuron; mesosulfuron (and/or as the methyl ester) and iodosulfuron methyl; foramsulfuron and iodosulfuron-methyl (optionally as the sodium salt); rimsulfuron and thifensulfuron; bensulfuron-methyl and thifensulfuron-methyl; thifensulfuron-methyl and chlorimuron-ethyl.

In one aspect of the invention the liquid herbicidal composition comprises at least one sulfonylurea that is not a pyridylsulfonylurea. In another aspect of the invention the herbicidal composition does not comprise a pyridylsulfonylurea. In one further aspect of the invention the herbicidal composition does not comprise nicosulfuron.

4.4 Lithium Salt

The composition of the present invention comprises an inorganic or organic lithium salt. Preferably, the lithium salt has a molecular weight of 250 or less. A molecular weight of 250 or less is preferred because it allows more lithium to be introduced to the formulation per unit weight of lithium-containing compound. This can improve sulfonylurea stability with reduced thickening of the sulfonylurea-containing composition itself. In this respect, the molecular weight of the lithium salt is preferably 200 or less, more preferably 150 or less, and even more preferably 100 or less. The fact that such lithium salts can stabilise a sulfonylurea in a non-aqueous system is surprising, more so when the lithium salt is not even dissolved in the composition but suspended therein.

The inorganic lithium salt or the organic lithium salt can have more than one lithium cation (e.g. two, three or four lithium cations). The salt need not be one that is prepared by reacting lithium or a lithium-containing compound with the inorganic or organic acid. It suffices for the purpose of this invention that the salt is one containing one or more lithium cation components and one or more carboxylic acid anion components.

The organic lithium salt is a salt of lithium and a $C_1$-$C_{12}$ organic acid. Preferably, the organic lithium salt is a salt of lithium and a $C_1$-$C_{10}$ organic acid, more preferably a $C_1$-$C_8$ organic acid, and even more preferably a $C_1$-$C_6$ organic acid. Salts of lithium and a $C_2$-$C_{10}$ organic acid, $C_2$-$C_8$ organic acid, $C_4$-$C_{10}$ organic acid, and $C_4$-$C_8$ organic acid are also contemplated and preferred. The organic acid may be saturated or unsaturated; it may be aliphatic, aromatic, or heterocyclic; and/or it may be straight-chained, branched or cyclic. As used herein, the use of terms such as "$C_1$-$C_{12}$ organic acid" should be taken as a disclosure of an organic acid having each of the possible number of carbon atoms in the stated range: in this case, one, two, three, four, five, six, seven, eight, nine, ten, eleven or twelve carbon atoms. For the avoidance of any doubt, the carboxylic acid groups in the organic acid, as well as the carbon atoms in any substituent on the organic acid, are also counted when assessing the total number of carbon atoms in the organic acid. Lithium salts of small-chain fatty acids ($C_1$-$C_5$) or medium-chain fatty acids ($C_6$-$C_{12}$) are particularly preferred for the stability that they provide to the sulfonylurea but with reduced thickening effect on the liquid formulation. In this respect, small-chain fatty acids are most preferred. Preferably, the small chain fatty acid is a $C_1$-$C_4$ organic acid, more preferably a $C_1$-$C_3$ organic acid, and most preferably a $C_1$- or $C_2$-organic acid. The organic acid may have one, two, three or more carboxyl groups. Derivatives of the organic acid are acids which are mono-, di-, tri- or polysubstituted along the carbon chain or the cyclic structure. Examples of substituents of the organic acids of the invention include $C_1$-$C_6$-alkyl, $C_2$-$C_6$-alkenyl, aryl, aralkyl and aralkenyl, hydroxymethyl, $C_2$-$C_6$-hydroxyalkyl, $C_2$-$C_6$-hydroxyalkenyl, aminomethyl, $C_2$-$C_6$-aminoalkyl, cyano, formyl, oxo, thioxo, hydroxyl, mercapto, amino, carboxyl or imino groups. Preferred substituents are $C_1$-$C_6$-alkyl (e.g. methyl, ethyl, propyl), hydroxymethyl, hydroxyl, amino and carboxyl groups. Examples of organic acids that can be used for the lithium organic acid salt include, but are not limited to, formic acid, acetic acid, propionic acid, butyric acid, lactic acid, citric acid, isobutyric acid, valeric acid, isovaleric acid, lauric acid, capric acid, caprylic acid, caproic acid, pivalic acid, oxalic acid, malonic acid, salicylic acid, tartaric acid, succinic acid, glutaric acid, glyceric acid, glyoxylic acid, adipic acid, pimelic acid, suberic acid, azelaic acid, sebacic acid, propiolic acid, crotonic acid, isocrotonic acid, elaidic acid, maleic acid, fumaric acid, muconic acid, citraconic acid, mesaconic acid, camphoric acid, phthalic acid (o-, m-, or p-), naphthoic acid, benzoic acid, toluic acid, hydratropic acid, atropic acid, cinnamic acid, isonicotinic acid, nicotinic acid, bicarbamic acid, 4,4'-dicyano-6,6'-binicotinic acid, 8-carbamoyl-octanoic acid, 1,2,4-pentanetricarboxylic acid, 2-pyrrolecarboxylic acid, malonaldehydic acid, 4-hydroxyphthalamic acid, 1-pyrazolecarboxylic acid, gallic acid or propanetricarboxylic acid. It is particularly preferred to use the lithium salt of formic acid, acetic acid, propionic acid, fumaric acid, salicylic acid, citric acid, lactic acid, oxalic acid and/or tartaric acid, with formic acid, acetic acid, citric acid and oxalic acid being most preferred.

The inorganic lithium salt is a salt of lithium and an inorganic acid. Exemplary inorganic acids include, but are not limited to, $HAlO_2$, $HAl(OH)_4$, $H_3AsO_4$, $HAsO_2$, $H_3AsO_3$, $H_3BO_3$, $(HBO_2)_n$, $H_2B_4O_7$, $HBO_3$, $HBrO_3$, $HBrO_2$, $HBrO$, $HBrO_4$, $H_2CO_3$, $H_4CO_4$, $H_2C_2O_6$, $H_2CO_4$ (or $H_2CO_3.H_2O_2$), $HClO_3$, $HClO_4$, $HClO_2$, $HClO$, $HONC$, $HOCN$, $HNCO$, $HIO_3$, $HIO$ (or $IOH$, $HIO_4$), $H_5IO_6$, $H_4I_2O_9$, $HNO_3$, $HNO_2$, $H_3PO_4$, $H_5PO_5$, $HPO_3$, $H_3PO_3$, $H_4P_2O_5$, $HPO_2$, $H_3PO_2$, $H_4P_2O_6$, $H_4P_2O_7$, $H_2SO_4$, $H_2SO_3$, $H_2S_2O_3$, $H_2S_2O_7$, $H_2SO_2$, $H_2S_xO_6$ (x=2-6), $H_6SO_6$, $H_2S_2O_4$, $H_2SO_5$, $H_2S_2O_8$, $HSO_3Cl$, $HSO_3F$, $H_2SiO_3$ (or $SiO_2.H_2O$), $H_4SiO_4$, $H_2Si_2O_5$ (or $SiO_2.H_2O$), $H_4Si_3O_8$, $H_6Si_2O_7$ (or $2SiO_2.3H_2O$), $H[CHB_{11}Cl_{11}]$, $H_2S$, $H_2CS_4$, $H_2CS_3$, $HCN$, $HSeCN$, $HSCN$, $HBF_4$, $H_2SiF_6$, $HPF_6$, $HF$, $HCl$, $HBr$, and $HI$. Preferably, the inorganic lithium salt is a carbonate, a phosphate, a sulphate, or a halide (preferably, F or Cl).

Lithium salts that are envisioned for use in the present invention include, by way of example, the following compounds: lithium acetate, lithium acetate dihydrate, lithium acetoacetate, lithium acetylacetonate, lithium iodoacetate, lithium 2-hydroxybutanoate, lithium molybdate, lithium titanate, lithium manganese oxide, lithium manganese dioxide, lithium iron phosphate, lithium zirconate, lithium iron oxide, lithium D-gluconate, lithium pentaborate, lithium bromide, lithium iodide, lithium chloride, lithium calcium chloride, lithium hydrogen carbonate, lithium carbonate, lithium citrate, lithium hydroxide, lithium manganate, lithium methionate, lithium oxalate, lithium monoxide, lithium oxide, lithium mono-orthophosphate, lithium orthophosphite, lithium silicate, lithium disilicate, lithium metasilicate, lithium sodium carbonate, lithium salt (E,E)-2,4-hexadienoic acid, dilithium fluorophosphate, dilithium fluorophosphite, lithium metaphosphate, trilithium phosphate, trilithium phosphite, lithium propanoate, lithium butanoate, lithium pentanoate, lithium hexanoate, lithium heptanoate, lithium octanoate, lithium nonanoate, lithium decanoate, lithium formate, lithium phosphate (dibasic, monobasic, tribasic), lithium salicylate, lithium-sodium phosphate, lithium sulfite, lithium sulfate, dilithium sulfite, lithium thiocyanate, lithium fluorosilicate, oxalic acid dilithium salt, lithium betahydropyruvic acid, lithium benzoate, cyclohexane acid lithium salt, lithium fluoride, lithium aluminate, lithium tetrafluoroborate, lithium thioacetate, L-glutamic acid monolithium salt, fumaric acid lithium salt, lithium trimethylsilanolate, lithium hydrogensulfate, lithium pyrophosphate, lithium dihydrogenphosphate, monolithium L-aspartic acid, lithium bromate, lithium periodate, monlithium salt D-saccharic acid, D-asparatic lithium salt, (R)-alpha-hyroxymethylaspartic acid lithium salt, lithium salt ethyl malonate, lithium salt lactic acid, dilithium thiosulfate, lithium dichloroacetate, lithium dimethylacetate, lithium diethylacetate, lithium dipropyl-acetate, lithium metaborate, lithium laurate, lithium caprate, lithium caprylate, lithium caproate, lithium tetraborate, lithium difluoride, lithium bismuthate, lithium borate, lithium chlorite, lithium hexametaphosphate, lithium hydrogenphosphite, lithium hydrogenselenite, lithium hydrogensulfite, lithium hydrosulfite, lithium hypochlorite, lithium polyphosphate, lithium polyphosphite, lithium propionate, lithium pyrophosphate, lithium selenate, lithium thiosulfate, lithium thiosulfide, and lithium thiosulfite. It is to be understood that the above list includes analogues, homologues, isomers, enantiomers, hydrates and derivatives thereof.

Both the anhydrous and hydrated forms of the lithium salts can be used for the purpose of this invention but the anhydrous form is most preferred in view of improving chemical stability of the sulfonylurea.

Surprisingly, lithium formate, lithium acetate, lithium citrate, lithium benzoate, lithium octanoate, lithium salicylate, lithium carbonate, lithium phosphate, lithium chloride and lithium sulphate provide for a sulfonylurea with superior chemical stability than many of the other salts mentioned herein, particularly with respect to those sulfonylureas that are more prone to hydrolysis in liquid compositions. For example, iodosulfuron-methyl, halosulfuron-methyl, metsulfuron-methyl, pyrazosulfuron-ethyl, and amidosulfuron were found to have excellent chemical stability in the presence of lithium acetate. As another example, iodosulfuron-methyl was found to have excellent chemical stability in the presence of lithium acetate, lithium formate, lithium benzoate, lithium octanoate, lithium salicylate, lithium citrate, lithium carbonate, lithium phosphate, lithium chloride and lithium sulphate.

Superior chemical stability has also been observed where:
the at least one lithium salt is lithium acetate and the sulfonylurea is selected from iodosulfuron-methyl or salts thereof, halosulfuron-methyl or salts thereof, metsulfuron-methyl or salts thereof, pyrazosulfuron-ethyl or salts thereof or amidosulfuron or salts thereof; or
the at least one lithium salt is lithium carbonate and the sulfonylurea is selected from iodosulfuron-methyl or salts thereof, or halosulfuron-methyl or salts thereof; or
the at least one lithium salt is lithium formate and the sulfonylurea is selected from iodosulfuron-methyl or salts thereof; or
the at least one lithium salt is lithium phosphate and the sulfonylurea is selected from iodosulfuron-methyl or salts thereof; or
the at least one lithium salt is lithium chloride and the sulfonylurea is selected from iodosulfuron-methyl or salts thereof; or
the at least one lithium salt is lithium sulphate and the sulfonylurea is selected from iodosulfuron-methyl or salts thereof;
the at least one lithium salt is lithium benzoate and the sulfonylurea is selected from iodosulfuron-methyl or salts thereof;
the at least one lithium salt is lithium octanoate and the sulfonylurea is selected from iodosulfuron-methyl or salts thereof, halosulfuron-methyl or salts thereof, pyrazosulfuron-ethyl or salts thereof, amidosulfuron or salts thereof, or foramsulfuron or salts thereof, or chlorsulfuron or salts thereof; or
the at least one lithium salt is lithium citrate and the sulfonylurea is selected from iodosulfuron-methyl or salts thereof.

Accordingly, the invention also relates to formulations, as described herein, comprising the above preferred combination of salt and sulfonylurea. The invention also relates to the use of a lithium salt to improve chemical stabilisation of a sulfonylurea herbicide, wherein the at least one lithium salt is lithium acetate and the sulfonylurea is selected from iodosulfuron-methyl or salts thereof, halosulfuron-methyl or salts thereof, metsulfuron-methyl or salts thereof, pyrazosulfuron-ethyl or salts thereof or amidosulfuron or salts thereof; or the at least one lithium salt is lithium carbonate and the sulfonylurea is selected from iodosulfuron-methyl or salts thereof, or halosulfuron-methyl or salts thereof; or the at least one lithium salt is lithium formate and the sulfonylurea is selected from iodosulfuron-methyl or salts thereof; or the at least one lithium salt is lithium phosphate and the sulfonylurea is selected from iodosulfuron-methyl or salts thereof; or the at least one lithium salt is lithium chloride and the sulfonylurea is selected from iodosulfuron-methyl or salts thereof; or the at least one lithium salt is lithium sulphate and the sulfonylurea is selected from iodosulfuron-methyl or salts thereof; or the at least one lithium salt is lithium citrate or lithium benzoate and the sulfonylurea is selected from iodosulfuron-methyl or salts thereof; or the at least one lithium salt is lithium octanoate and the sulfonylurea is selected from iodosulfuron-methyl or salts thereof, halosulfuron-methyl or salts thereof, pyrazosulfuron-ethyl or salts thereof, amidosulfuron or salts thereof, or foramsulfuron or salts thereof, or chlorsulfuron or salts thereof.

In terms of improving chemical stability of the sulfonylurea, the lithium salt is preferably comprised in the liquid composition of the invention in an amount of at least 0.01 wt. % based on the total weight of the liquid composition. More preferably, the lithium salt is comprised in an amount of at least 0.03 wt. %, at least 0.05 wt. %, at least 0.1 wt. %, at least 0.2 wt. %, at least 0.5 wt. %, at least 1 wt. %, at least 2 wt. %. The lithium salt is preferably comprised in the composition in an amount of 30 wt. % or less to reduce physical stability problems of the formulation and to reduce interference with the function of any surfactants that are optionally present. More preferably, the lithium salt is comprised in an amount of 25 wt. % or less, 20 wt. % or less, 15 wt. % or less, 10 wt. % or less, 8 wt. % or less, 6 wt. % or less, 5 wt. % or less, 2 wt. % or less, 1 wt. % or less, or 0.7 wt. % or less. Any of the preferred lower wt. % limits for the amount of lithium salt can be combined with any of the preferred upper wt. % limits to define further suitable wt. % ranges for the present invention. As an example, further exemplary ranges for the amount of lithium salt in the liquid composition include 0.01 to 30 wt. %, 0.1 to 25 wt. %, 1 to 20 wt. %, 1 to 10 wt. %, 0.5 to 10 wt. %, 1 to 5 wt. %, 0.5 to 5 wt. %, 0.1 to 2 wt. %, 0.2 to 2 wt. %, 0.2 to 1 wt. %, and 0.2 to 0.7 wt. %.

The weight ranges above refer to the total amount of inorganic lithium salt and organic lithium salt wherein the organic lithium salt is selected from the $C_1$-$C_{12}$ organic carboxylic acid salts of lithium. The weight ranges above do not refer to the lithium salt of a sulfonylurea or lithium salt of a non-sulfonylurea herbicide should these be present in the composition. When more than one inorganic or organic lithium salt as described herein is present in the composition (e.g. lithium acetate and lithium carbonate), then the amounts described herein refer to the sum amount of all the inorganic and organic lithium salts that are present in the composition, wherein the organic lithium salt refers to the $C_1$-$C_{12}$ organic carboxylic acid salts of lithium.

In terms of improving chemical stability, it is preferable that the weight ratio of the lithium salt to sulfonylurea is 0.1 or greater. Preferably, the weight ratio of the lithium salt to sulfonylurea is 0.2 or greater, 0.3 or greater, 0.5 or greater, 0.7 or greater, or 1 or greater. The weight ratio of the lithium salt to sulfonylurea is preferably 5 or less, 4 or less, 3 or less, 2 or less, or 1 or less. The preferred weight ratios refer to the total amount of the inorganic lithium salt and $C_1$-$C_{12}$ organic acid lithium salt with respect to the total amount of sulfonylurea compounds in the liquid composition. Any of the preferred lower weight ratio limits can be combined with any of the preferred upper weight ratio limits to define further suitable weight ratio ranges for the present invention. As an example, further exemplary ranges for the weight ratio of the lithium salt to sulfonylurea include 0.1 to 5, 0.2 to 4, 0.3 to 3, 0.3 to 1, 0.5 to 2, 0.7 to 2, 0.1 to 2, 1 to 2 and 1 to 5.

In one embodiment of the invention the liquid herbicidal composition comprises:
a non-aqueous solvent system;
at least one sulfonylurea herbicide, wherein the total amount of sulfonylurea compounds is 1 to 50 wt. % of the composition; and
at least one inorganic or $C_1$-$C_{12}$ organic lithium salt, wherein the total amount of said lithium salt is 0.1 to 20 wt. %;
with the proviso that the weight ratio of said lithium salt to sulfonylurea is in the range of from 0.1 to 10.

In a preferred embodiment of the invention the total amount of sulfonylurea compounds is 2 to 20 wt. %, the total amount of inorganic or $C_1$-$C_{12}$ organic lithium salt is 1 to 20 wt. %, and the weight ratio of said lithium salt to sulfonylurea is in the range of from 0.1 to 10.

In a preferred embodiment of the invention the total amount of sulfonylurea compounds is 2 to 20 wt. %, the total amount of inorganic or $C_1$-$C_{12}$ organic lithium salt is 1 to 20 wt. %, and the weight ratio of said lithium salt to sulfonylurea is in the range of from 0.5 to 2.5, preferably 0.7 to 2.0.

In any of the embodiments above, the lithium salt can be a $C_1$-$C_3$ organic carboxylic acid salt.

In any of the embodiments above, the liquid herbicidal composition may comprise iodosulfuron methyl (optionally as the sodium salt), halosulfuron-methyl, metsulfuron-methyl, pyrazosulfuron-ethyl or amidosulfuron.

In any of the embodiments above, the liquid herbicidal composition may contain only one sulfonylurea selected from iodosulfuron methyl (optionally as the sodium salt), halosulfuron-methyl, metsulfuron-methyl, pyrazosulfuron-ethyl and amidosulfuron.

In any of the embodiments above, if the salt includes lithium acetate, lithium formate, lithium carbonate, lithium chloride, lithium sulphate, lithium octanoate, lithium benzoate or lithium citrate, then the weight ratio of these salts (individually, or collectively if more than one is present) to the total amount of sulfonylurea is preferably in the range of from 0.1 to 10, more preferably in the range of from 0.5 to 2.

Maintaining the particle size of the lithium salt within a defined range may provide benefits in terms of improved chemical stability of the sulfonylurea. The particle size (D50) of the lithium salt is preferably at least 100 nm or more, at least 200 nm or more, at least 500 nm or more, at least 1 µm or more, at least 1.5 µm or more, or at least 2 µm or more. The particle size (D50) of the lithium salt is preferably 30 µm or less, 15 µm or less, 10 µm or less, 5 µm or less, 3 µm or less, 1 µm or less, or 500 nm or less to improve chemical stability of the sulfonylurea in the composition. Any of the preferred lower limits for the lithium salt particle size can be combined with any of the preferred upper limits to define further suitable salt particle size ranges for the present invention. As an example, further exemplary ranges for the particle size of the lithium salt include 0.1-30 µm, 0.2-15 µm, 0.5-10 µm, 0.1-0.5 µm, 0.2-1 µm, 0.5-3 µm, 1-15 µm, 1-10 µm, 1-5 µm, 1-3 µm, 1.5-15 µm, 2-15 µm, 2-10 µm, 2-5 µm, and 2-3 µm. D50 refers to the volume median particle size and can be determined by laser light scattering using the method described in CIPAC MT187.

4.5 Non-Aqueous Solvent

The composition of the present invention comprises a non-aqueous solvent system. The term "non-aqueous solvent system" means that one or more solvents other than water (e.g. organic solvents) are used as the liquid carrier in the liquid composition. This does not mean to say that the solvent system must necessarily be completely free of water. Trace amounts of water may be present in the components that are used to prepare the non-aqueous solvent system. For instance, trace amounts of water may be introduced into the solvent system by organic solvents, surfactants or salts that are used to prepare the liquid herbicidal composition. While the term "non-aqueous solvent system" is clear in this technical field (e.g. ODs, ECs and SLs employ a non-aqueous solvent system), for the avoidance of any doubt the term can be taken to mean that the liquid composition comprises water in an amount of 5 wt. % or less of the composition, preferably 3 wt. % or less, more preferably 2 wt. % and most preferably 1 wt. % or less.

The sulfonylurea and lithium salt are dissolved, dispersed, suspended or otherwise contained in the non-aqueous solvent system. Typical solvents are described in Marsden, Solvents Guide, 2nd Ed., Interscience, New York, 1950. The non-aqueous solvent system preferably contains one or more aprotic organic solvents as the major constituent of the solvent system. When the amount of aprotic solvent in the solvent system is 50 wt. % or more, the ability of the lithium salt to chemically stabilise the sulfonylurea is greatly improved. Preferably, the one or more aprotic solvents make up 60 wt. % or more, 70 wt. % or more, 80 wt. % or more and most preferably 90 wt. % or more of the solvent system. Suitable aprotic organic solvents for use in the present invention include, for example, those listed under "Component (C)" in US 2005/0113254 (Bayer CropScience GmbH):

(1) hydrocarbons, which may be unsubstituted or substituted, for example
   (1a) aromatic hydrocarbons, for example mono- or polyalkyl-substituted benzenes, such as toluene, xylenes, mesitylene, ethylbenzene, or mono- or polyalkyl-substituted naphthalenes, such as 1-methylnaphthalene, 2-methylnaphthalene or dimethylnaphthalene, or other benzene-derived aromatic hydrocarbons, such as indane or Tetralin®, or mixtures thereof,
   (1b) aliphatic hydrocarbons, for example straight-chain or branched aliphatics, for example of the formula $C_nH_{2n+2}$, such as pentane, hexane, octane, 2-methylbutane or 2,2,4-trimethylpentane, or cyclic, optionally alkyl-substituted aliphatics, such as cyclohexane or methylcyclopentane, or mixtures thereof, such as solvents of the Exxsol® D series, Isopar® series or Bayol® series, for example Bayol® 82 (ExxonMobil Chemicals), or the Isane® IP series or Hydroseal® G series (TotalFinaElf), as well as straight-chain, branched or cyclic unsaturated aliphatics including terpenes such as turpentine and its constituents (e.g. pinene, camphene) as well as compounds derivable therefrom such as isobornyl acetate (exo-1,7,7-trimethylbicyclo[2.2.1]hept-2-yl acetate), (1c) mixtures of aromatic and aliphatic hydrocarbons, such as solvents of the Solvesso® series, for example Solvesso® 100, Solvesso® 150 or Solvesso® 200 (ExxonMobil Chemicals), of the Solvarex®/Solvaro® series (TotalFinaElf) or the Caromax® series, for example Caromax® 28 (Petrochem Carless), or (1d) halogenated hydrocarbons, such as halogenated aromatic and aliphatic hydrocarbons, such as chlorobenzene or methylene chloride;

(2) aprotic polar solvents, such as ethers, esters of $C_1$-$C_9$-alkanoic acids which may be mono-, di- or polyfunctional, such as their mono-, di- or triesters, for example with $C_1$-$C_{18}$-alkyl alcohols, ketones with a low tendency to tautomerize, phosphoric acid esters, amides, nitriles or sulfones, for example tris-2-ethylhexyl phosphate, diisobutyl adipate, Rhodiasolv® RPDE (Rhodia), cyclohexanone, Jeffsol® PC (Huntsman), γ-butyrolactone, pyrrolidone-based solvents such as N-methylpyrrolidone or N-butylpyrrolidone, dimethyl sulfoxide, acetonitrile, tributylphosphatam or the Hostarex® PO series (Clariant);

(3) fatty acid esters, for example of natural origin, for example natural oils, such as animal oils or vegetable oils, or of synthetic origin, for example the Edenor® series, for example Edenor® MEPa or Edenor® MESU, or the Agnique® ME series or Agnique® AE series (Cognis), the Salim® ME series (Salim), the Radia® series, for example Radia® 30167 (ICI), the Prilube® series, for example Prilube® 1530 (Petrofina), the Stepan® C series (Stepan) or the Witconol® 23 series (Witco). The fatty acid esters are preferably esters of $C_{10}$-$C_{22}$-, with preference $C_{12}$-$C_{20}$-fatty acids. The $C_{10}$-$C_{22}$-fatty acid esters are, for example, esters of unsaturated or saturated $C_{10}$-$C_{22}$-fatty acids, in particular those having an even number of carbon atoms, for example erucic acid, lauric acid, palmitic acid, and in particular $C_{18}$-fatty acids, such as stearic acid, oleic acid, linoleic acid or linolenic acid.

Examples of fatty acid esters such as $C_{10}$-$C_{22}$-fatty acid esters are glycerol and glycol esters of fatty acids such as $C_{10}$-$C_{22}$-fatty acids, or transesterification products thereof, for example fatty acid alkyl esters such as $C_{10}$-$C_{22}$-fatty acid $C_1$-$C_{20}$-alkyl esters, which can be obtained, for example, by transesterification of the abovementioned glycerol or glycol fatty acid esters such as $C_{10}$-$C_{22}$-fatty acid esters with $C_1$-$C_{20}$-alcohols (for example methanol, ethanol, propanol or butanol). Preferred fatty acid alkyl esters such as $C_{10}$-$C_{22}$-fatty acid $C_1$-$C_{20}$-alkyl esters are methyl esters, ethyl esters, propyl esters, butyl esters, 2-ethylhexyl esters and dodecyl esters. Preferred glycol and glycerol fatty acid esters such as $C_{10}$-$C_{22}$-fatty acid esters are the uniform or mixed glycol esters and glycerol esters of $C_{10}$-$C_{22}$-fatty acids, in particular of such fatty acids having an even number of carbon atoms, for example erucic acid, lauric acid, palmitic acid and in particular $C_{18}$-fatty acids such as stearic acid, oleic acid, linoleic acid or linolenic acid.

Animal oils and vegetable oils are generally known and commercially available. For the purpose of the present invention, the term "animal oils" is to be understood as meaning oils of animal origin such as whale oil, cod-liver oil, musk oil or mink oil, and the term "vegetable oils" is to be understood as meaning oils of oleaginous plant species, such as soybean oil, rapeseed oil, corn oil, sunflower oil, cottonseed oil, linseed oil, coconut oil, palm oil, thistle oil, walnut oil, arachis oil, olive oil or castor oil, in particular rapeseed oil, where the vegetable oils also include their transesterification products, for example alkyl esters, such as rapeseed oil methyl ester or rapeseed oil ethyl ester.

The vegetable oils are preferably esters of $C_{10}$-$C_{22}$-fatty acids, preferably $C_{12}$-$C_{20}$-fatty acids. The $C_{10}$-$C_{22}$-fatty acid esters are, for example, esters of unsaturated or saturated $C_{10}$-$C_{22}$-fatty acids having, in particular, an even number of carbon atoms, for example erucic acid, lauric acid, palmitic acid and in particular $C_{18}$-fatty acids such as stearic acid, oleic acid, linoleic acid or linolenic acid. Examples of vegetable oils are $C_{10}$-$C_{22}$-fatty acid esters of glycerol or glycol with $C_{10}$-$C_{22}$-fatty acids, or $C_{10}$-$C_{22}$-fatty acid $C_1$-$C_{20}$-alkyl esters which can be obtained, for example, by transesterification of the glycerol or glycol $C_{10}$-$C_{22}$-fatty acid esters mentioned above with $C_1$-$C_{20}$-alcohols (for example methanol, ethanol, propanol or butanol). The vegetable oils can be contained in the mixtures for example in the form of commercially available vegetable oils, in particular rapeseed oils, such as rapeseed oil methyl ester, for example Phytorob® B (Novance, France), Edenor® MESU and the Agnique® ME series (Cognis, Germany) the Radia® series (ICI), the Prilube® series (Petrofina), or biodiesel or in the form of commercially available plant-oil-containing formulation additives, in particular those based on rapeseed oils, such as rapeseed oil methyl esters, for example Hasten® (Victoria Chemical Company, Australia), Actirob® B (Novance, France), Rako-Binol® (Bayer AG, Germany), Renol® (Stefes, Germany) or Mero® (Stefes, Germany).

Examples of synthetic acid esters are, for example, those derived from fatty acids having an odd number of carbon atoms, such as $C_{11}$-$C_{21}$-fatty acid esters.

Preferred organic solvents are hydrocarbons, in particular aromatic hydrocarbons and/or aliphatic hydrocarbons and fatty acid esters, such as vegetable oils, such as triglycerides of fatty acids having 10 to 22 carbon atoms, which may be saturated or else unsaturated, straight-chain or branched and which may or may not carry further functional groups, such as corn oil, rapeseed oil, sunflower oil, cottonseed oil, linseed oil, soybean oil, coconut oil, palm oil, thistle oil or castor oil, and their trans-esterification products, such as fatty acid alkyl esters, and mixtures thereof.

Preferred solvents for use in the present invention include: linear or branched C6 to C30 paraffin oils, for example hexane, heptane, octane, nonane, decane, undecane, dodecane, tridecane, tetradecane, pentadecane, hexadecane, their mixtures, or mixtures thereof with higher boiling homologs, such as hepta-, octa-, nona-decane, eicosane, heneicosane, docosane, tricosane, tetracosane, pentacosane, and the branched chain isomers thereof; aromatic or cycloaliphatic solvents, which may be unsubstituted or substituted, C7- to C18-hydrocarbon compounds such as mono- or polyalkyl-substituted benzenes, or mono- or polyalkyl-substituted naphthalenes; vegetable oils such as liquid triglycerides, for example olive oil, kapok oil, castor oil, papaya oil, camellia oil, palm oil, sesame oil, corn oil, rice bran oil, peanut oil, walnut oil, coconut oil, cotton seed oil, soybean oil, rapeseed oil, linseed oil, tung oil, sunflower oil, safflower oil, or also transesterification products thereof, e.g. alkyl esters, such as rapeseed oil methyl ester or rapeseed oil ethyl ester; animal oil, such as whale oil, cod-liver oil, or mink oil; liquid esters of C1 to C12 monoalcohols or polyols, for example butanol, n-octanol, i-octanol, dodecanol, cyclopentanol, cyclohexanol, cyclooctanol, ethylene glycol, propylene glycol or benzyl alcohol, with C2 to C10 carboxylic or polycarboxylic acids, such as caproic acid, capric acid, caprylic acid, pelargonic acid, succinic acid and glutaric acid; or with aromatic carboxylic acids such as benzoic acid, toluic acid, salicylic acid and phthalic acid. Esters which can be used in the composition of the invention are thus, for example, benzyl acetate, caproic acid ethyl ester, isobornyl acetate, pelargonic acid ethyl ester, benzoic acid methyl or ethyl ester, salicylic acid methyl, propyl, or butyl ester, diesters of phthalic acid with saturated aliphatic or alicyclic C1 to C12 alcohols, such as phthalic acid dimethyl ester, dibutyl ester, diisooctyl ester; liquid amides of C1-C3 amines, alkylamines or alkanolamines with C6 to C18 carboxylic acids; or mixtures thereof.

The non-aqueous solvent system is present in an amount such that it can act as a liquid carrier for the other components that are present in the composition. Preferably, the non-aqueous solvent system comprises an organic solvent in an amount of at least 5 wt. % based on the weight of the composition. A low amount of organic solvent is possible when other components in the composition are also liquids (e.g. liquid herbicide and/or liquid emulsifier). More preferably, the non-aqueous solvent system comprises an organic solvent in an amount of at least 10 wt. %, at least 15 wt. %, at least 20 wt%, at least 25 wt%, at least 30 wt. %, or at least 40 wt. % of the composition. Preferably the non-aqueous solvent system comprises an organic solvent in an amount of 95 wt. % or less of the composition. More preferably the non-aqueous solvent system comprises an organic solvent in an amount of 90 wt. % or less, 85 wt. % or less, 80 wt. % or less, 75 wt. % or less, or 60 wt. % or less of the composition. Any of the disclosed wt. % lower limits for the amount of the organic solvent in the non-aqueous solvent system can be combined with any of the disclosed wt. % upper limits to define further suitable wt. % ranges for the purpose of this invention. As an example, exemplary ranges for the amount of the organic solvent in the composition include 5 to 95 wt. %, 10 to 90 wt. %, 20 to 80 wt. %, 30 to 60 wt. %, 40 to 60 wt. %, 10 to 75 wt. % and 20 to 60 wt. %.

When more than one organic solvent is present in the composition then the amounts described herein refer to the sum amount of all the organic solvents present in the composition.

The total amount of protic organic solvent such as alcohols, amines and carboxylic acids is preferably kept to 20 wt. % or less based on the weight of the liquid composition. More preferably, the total amount of protic organic solvent is 15 wt. % or less, 10 wt. % or less, 5 wt. % or less, 2 wt. % or less, or 1 wt. % or less of the composition. When more than one protic solvent is present in the composition then the amounts described herein refer to the sum amount of all the protic solvents present in the composition.

4.6 Additional Active Agents

4.6.1 Non-Sulfonylurea Herbicides

The composition of the present invention may comprise one or more herbicides in addition to the sulfonylurea herbicide(s). These additional non-sulfonylurea herbicides may be liquids, waxy solids or powders and may be dissolved, dispersed, suspended or otherwise contained in the composition. The additional herbicidal compound is not particularly limited and can be any herbicidal compound known in the art. For example, the compound may be selected from the herbicidal compounds listed in the 16$^{th}$ Edition of "The Pesticide Manual" (ISBN-10: 190139686X) and the literature cited therein. Exemplary additional herbicidal compounds include:

2,4-D (e.g. ester or amine), 2,4-DB, 2,3,6-TBA, acetochlor, acifluorfen, acifluorfen-sodium, aclonifen, alachlor, alloxydim, alloxydim-sodium, ametryn, amicarbazone, aminopyralid, amitrole, anilofos, asulam, atrazine, azafenidin, beflubutamid, benazolin,-benazolin-ethyl, benfuresate, bentazone, benzfendizone, benzobicyclon, benzofenap, bifenox, bilanafos, bispyribac-sodium, bromacil, bromobutide, bromofenoxim, bromoxynil, butachlor, butafenacil, butenachlor, butralin, butroxydim, butylate, cafenstrole, carbetamide, carfentrazone-ethyl, chlomethoxyfen, chloridazon, chlornitrofen, chlorotoluron, cinidon-ethyl, cinmethylin, clefoxydim, clethodim, clodinafop-propargyl, clomazone, clomeprop, clopyralid, cloransulam-ethyl, cumyluron, cyanazine, cycloxydim, cyhalofop-butyl, daimuron, dazomet, desmedipham, dicamba, dichlobenil, dichlorprop, dichlorprop-P, diclofop-methyl, diclosulam, difenzoquat, diflufenican, diflufenzopyr, dikegulac-sodium, dimefuron, dimepiperate, dimethachlor, dimethametryn, dimethenamid, diquat-dibromide, dithiopyr, diuron, dymron, EPTC, esprocarb, ethalfluralin, ethofumesate, ethoxyfen, etobenzanid, fenoxaprop-ethyl, fenoxaprop-P-ethyl, fentrazamide, flamprop-M-isopropyl, flamprop-M-methyl, florasulam, fluazifop, fluazifop-butyl, fluazolate, flucarbazone-sodium, fluchloralin, flufenacet, flufenpyr, flumetsulam, flumiclorac-pentyl, flumioxazin, fluometuron, fluorochloridone, fluoroglycofen-ethyl, flupoxam, fluridone, fluroxypyr, fluroxypyr-butoxypropyl, fluroxypyr-meptyl, flurprimidol, flurtamone, fluthiacet-methyl, fomesafen, glufosinate, glufosinate-ammonium, glyphosate, haloxyfop, haloxyfop-ethoxyethyl, haloxyfop-methyl, haloxyfop-P-methyl, hexazinone, imazamethabenz-methyl, imazamox, imazapic, imazapyr, imazaquin, imazethapyr, indanofan, ioxynil, isoproturon, isouron, isoxaben, isoxachlortole, isoxaflutole, ketospiradox, lactofen, lenacil, linuron, MCPA, MCPB, mecoprop, mecoprop-P, mefenacet, mesotrione, metamifop, metamitron, metazachlor, methabenzthiazuron, methyldymron, metobromuron, metolachlor, metosulam, metoxuron, metribuzin, molinate, monolinuron, naproanilide, napropamide, neburon, norflurazon, orbencarb, oryzalin, oxadiargyl, oxadiazon, oxaziclomefone, oxyfluorfen, paraquat, pelargonic acid, pendimethalin, pendralin, penoxsulam, pentoxazone, pethoxamid, phenmedipham, picloram, picolinafen, pinoxaden, piperophos, pretilachlor, profluazol, profoxydim, prometryn, propachlor, propanil, propaquizafop, propisochlor, propoxycarbazone-sodium, propyzamide, prosulfocarb, pyraclonil, pyraflufen-ethyl, pyrazolate, pyrazoxyfen, pyribenzoxim, pyributicarb, pyridafol, pyridate, pyriftalid, pyriminobac-methyl, pyrithiobac-sodium, quinclorac, quinmerac, quinoclamine, quizalofop-ethyl, quizalofop-P-ethyl, quizalofop-P-tefuryl, sethoxydim, simazine, simetryn, S-metolachlor, sulcotrione, sulfentrazone, sulfosate, tebuthiuron, tepraloxydim, terbuthylazine, terbutryn, thenylchlor, thiazopyr, thiobencarb, tiocarbazil, tralkoxydim, triallate, triaziflam, triclopyr, tridiphane, and trifluralin.

The additional non-sulfonylurea herbicide is preferably comprised in the liquid composition of the invention in an amount of at least 0.1 wt. %. More preferably, the non-sulfonylurea herbicide is comprised in an amount of at least 0.2 wt. %, at least 0.5 wt. %, at least 0.7 wt. %, at least 1 wt. %, at least 2 wt. %, at least 5 wt. %, at least 10 wt. %, at least 15 wt. %, at least 20 wt. % or at least 25 wt. %. The non-sulfonylurea herbicide is preferably comprised in the composition an amount of 95 wt. % or less. A large amount of non-sulfonylurea herbicide is possible when the non-sulfonylurea herbicide is itself a liquid. More preferably, the non-sulfonylurea herbicide is comprised in an amount of 60 wt. % or less, 50 wt. % or less, 40 wt. % or less, 35 wt. % or less, 30 wt. % or less or 25 wt. % or less. Any of the disclosed wt. % lower limits for the amount of non-sulfonylurea herbicide can be combined with any of the disclosed wt. % upper limits to define further suitable wt. % ranges for the purposes of this invention. As an example, further exemplary ranges for the amount of non-sulfonylurea herbicide in the liquid composition include 0.1 to 95 wt. %, 1 to 60 wt. %, 2 to 50 wt. %, 5 to 40 wt. %, 10 to 30 wt. %, 15 to 25 wt. %, 25 to 35 wt. % and 10 to 50 wt. %.

When a salt or derivative (ester, etc.) of the non-sulfonylurea herbicide is employed for the purposes of this invention then the wt. % amounts that are described herein refer to the weight of the salt or derivative. When more than one non-sulfonylurea herbicide is present in the composition (as a salt, derivative or otherwise), then the amounts described herein refer to the sum amount of all of the non-sulfonylurea herbicides present in the composition.

In the present invention one or more of the non-sulfonylurea herbicides may be partially or wholly encapsulated (e.g. microcapsules) such as is described in WO 2008/061721 A2 (GAT Microencapsulation AG). In such case the wt. % amounts that are described herein refer to the weight of the non-sulfonylurea herbicides without the encapsulating material.

The liquid composition of the invention may comprise any of the sulfonylureas described herein with any of the non-sulfonylurea herbicides described herein.

For example, the liquid composition may comprise tribenuron-methyl and any of the other non-sulfonylurea herbicides described herein. Exemplary combinations with tribenuron-methyl include: tribenuron-methyl and 2,4-D (e.g. as ester or amine or choline salt); tribenuron methyl and MCPA (e.g. as ester or amine); tribenuron-methyl and bromoxynil; tribenuron-methyl and glyphosate; tribenuron-methyl and fluroxypyr; tribenuron-methyl and dicamba (e.g. as the sodium salt or diglycolamine salt or ester); tribenuron-methyl and mecoprop-P; tribenuron-methyl and MCPB; tribenuron-methyl, fluroxypyr and clopyralid; tribenuron-methyl and carfentrazone ethyl; tribenuron-methyl and clopyralid (e.g. as MEA salt); tribenuron-methyl and clodinafop; tribenuron-methyl and quinclorac; tribenuron-methyl and florasulam.

The liquid composition may comprise nicosulfuron and any of the other non-sulfonylurea herbicides described herein. Exemplary combinations with nicosulfuron include: nicosulfuron and dicamba (optionally as the sodium salt or ester); nicosulfuron and atrazine; nicosulfuron and flumetsulam; nicosulfuron and clopyralid (optionally as the potassium salt or ester); nicosulfuron and diflupenzopyr (optionally as the sodium salt or ester); nicosulfuron and metolachlor; nicosulfuron and terbuthylazine; nicosulfuron and mesotrione; and nicosulfuron and bentazone.

The liquid composition may comprise metsulfuron-methyl and any of the other non-sulfonylurea herbicides described herein. Exemplary combinations with metsulfuron-methyl include: metsulfuron-methyl and acetochlor; metsulfuron-methyl and carfentrazone ethyl; metsulfuron-methyl and imazapyr; metsulfuron-methyl and aminopyralid; metsulfuron-methyl and fluroxypyr; metsulfuron-methyl and mecoprop-p; metsulfuron-methyl and picloram; metsulfuron-methyl and pyraflufen ethyl; metsulfuron-methyl and propanil; metsulfuron-methyl and glyphosate-ammonium; metsulfuron-methyl and dicamba (optionally as the sodium, dimethylammonium or diglycolamine salt or as an ester); metsulfuron-methyl and 2,4-D (optionally as the dimethylammonium salt, choline salt, or an ester); and metsulfuron-methyl, dicamba (optionally as the sodium, dimethylammonium or diglycolamine salt or as an ester) and 2,4-D (optionally as the dimethylammonium salt, choline salt, or an ester).

Further exemplary combinations of sulfonylureas and non-sulfonylureas for use in the present invention include: bensulfuron-methyl and acetochlor; bensulfuron-methyl and indanofan; bensulfuron-methyl and clomeprop; bensulfuron-methyl and pretilachlor; bensulfuron-methyl and fentrazamide; bensulfuron-methyl and thenylchlor; bensulfuron-methyl and pentoxazone; bensulfuron-methyl and pyriminobac-methyl; bensulfuron-methyl and bromobutide; bensulfuron-methyl, pentoxazone, pyriminobac-methyl, and bromobutide; bensulfuron-methyl and butachlor; bensulfuron-methyl and daimuron; bensulfuron-methyl and mefenacet; bensulfuron-methyl, daimuron and mefenacet; chlorimuron ethyl and sulfentrazone; iodosulfuron-methyl (optionally as the sodium salt) and isoxadifen-ethyl; iodosulfuron-methyl (optionally as the sodium salt) and propoxycarbazone (optionally as the sodium salt); iodosulfuron-methyl (optionally as the sodium salt) and diflufenican; iodosulfuron-methyl (optionally as the sodium salt) and fenoxaprop-P-ethyl; mesosulfuron (and/or as the methyl ester) and diflufenican; mesosulfuron (and/or as the methyl ester) and propoxycarbazone (e.g. sodium salt); pyrazosulfuron-ethyl and pretilachlor; pyrazosulfuron-ethyl and pyriftalid; pyrazosulfuron-ethyl and mefenacet; pyrazosulfuron-ethyl and esprocarb; pyrazosulfuron-ethyl and dimethametryn; pyrazosulfuron-ethyl and oxaziclomefone; pyrazosulfuron-ethyl and benzobicyclon; pyrazosulfuron-ethyl and cyhalofop-butyl; pyrazosulfuron-ethyl and penoxsulam; pyrazosulfuron-ethyl, cyhalofop-butyl, pretilachlor, and dimethametryn; pyrazosulfuron-ethyl, benzobicyclon and penoxsulam; pyrazosulfuron-ethyl, benzobicyclon, dimethametryn and oxaziclomefone; pyrazosulfuron-ethyl, pretilachlor, dimethametryn, and esprocarb; pyrazosulfuron-ethyl, benzobicyclon, butachlor and pyraclonil; pyrazosulfuron-ethyl, benzobicyclon and fentrazamide; foramsulfuron and isoxadifen ethyl; foramsulfuron and cyprosulfamide; foramsulfuron and thiencarbazone-methyl; foramsulfuron, iodosulfuron-methyl sodium salt, and isoxadifen ethyl; foramsulfuron, iodosulfuron-methyl sodium salt, cyprosulfamide and thiencarbazone-methyl; iodosulfuron and thiencarbazone-methyl; metsulfuron methyl, bensulfuron-methyl and acetochlor; thifensulfuron-methyl, chlorimuron-ethyl and flumioxazin; rimsulfuron and mesotrione; rimsulfuron and metolachlor; rimsulfuron and dicamba; rimsulfuron, metolachlor and dicamba; thifensulfuron-methyl and one or more of dicamba, 2,4-D-ester, MCPA-ester, clodinafop, quinclorac, fluroxypyr, acetochlor, lenacil and prometryn; chlorimuron-ethyl and acetochlor; chlorimuron-ethyl and metribuzin; chlorimuron-ethyl and imazethapyr.

4.6.2 Safeners

The composition of the present invention may comprise one or more safeners that may be dissolved, dispersed, suspended or otherwise contained in the composition. Suitable safeners are those listed in the *"The Pesticide Manual"* (ISBN-10: 190139686X), as well as those listed in paragraphs [0113] to [0129] of US 2006/0276337 A1, which paragraphs are incorporated herein by reference.

Exemplary safeners include:
(1) compounds of the type of dichlorophenylpyrazoline-3-carboxylic acid such as ethyl 1-(2,4-dichlorophenyl)-5-(ethoxy-carbonyl)-5-methyl-2-pyrazoline-3-carboxylate and related compounds, as described in WO 91/07874;
(2) derivatives of dichlorophenylpyrazolecarboxylic acid, preferably compounds such as ethyl 1-(2,4-dichlorophenyl)-5-methylpyrazole-3-carboxylate, ethyl 1-(2,4-dichlorophenyl)-5-isopropylpyrazole-3-carboxylate, ethyl 1-(2,4-dichlorophenyl)-5-(1,1-dimethylethyl) pyrazole-3-carboxylate, ethyl 1-(2,4-dichlorophenyl)-5-phenylpyrazole-3-carboxylate and related compounds, as described in EP-A-333 131 and EP-A-269 806;
(3) compounds of the type of the triazolecarboxylic acids, preferably compounds such as fenchlorazole, i.e. ethyl 1-(2,4-dichlorophenyl)-5-trichloro-methyl-(1H)-1,2,4-triazole-3-carboxylate, and related compounds (see EP-A-174 562 and EP-A-346 620);
(4) compounds of the type of the 5-benzyl- or 5-phenyl-2-isoxazoline-3-carboxylic acid, or the 5,5-diphenyl-2-isoxazoline-3-carboxylic acid, preferably compounds such as ethyl 5-(2,4-dichlorobenzyl)-2-isoxazoline-3-carboxylate or ethyl 5-phenyl-2-isoxazoline-3-carboxylate and related compounds, as described in WO 91/08202, or ethyl 5,5-diphenyl-2-isoxazolinecarboxylate or n-propyl ester or ethyl 5-(4-fluorophenyl)-5-phenyl-2-isoxazoline-3-carboxylate, as described in the patent application (WO-A-95/07897);
(5) compounds of the type of the 8-quinolineoxyacetic acid, preferably 1-methylhex-1-yl (5-chloro-8-quinolineoxy)acetate, 1,3-dimethylbut-1-yl (5-chloro-8-quinolineoxy)acetate, 4-allyloxybutyl (5-chloro-8-quinolineoxy)acetate, 1-allyloxyprop-2-yl (5-chloro-8-quinolineoxy)acetate, ethyl (5-chloro-8-quinolineoxy) acetate, methyl (5-chloro-8-quinolineoxy)acetate, allyl (5-chloro-8-quinolineoxy)acetate, 2-(2-propylideneiminooxy)-1-ethyl (5-chloro-8-quinolineoxy)acetate, 2-oxoprbp-1-yl (5-chloro-8-quinolineoxy)acetate and related compounds, as described in EP-A-86 750, EP-A-94 349 and EP-A-191 736 or EP-A-0 492 366;
(6) compounds of the type of the (5-chloro-8-quinolineoxy)malonic acid, preferably compounds such as diethyl (5-chloro-8-quinolineoxy)malonate, diallyl (5-chloro-8-quinolineoxy)malonate, methyl ethyl (5-chloro-8-quinoline-oxy)malonate and related compounds, as described in EP-A-0 582 198;
(7) active compounds of the type of the phenoxyacetic or -propionic acid derivatives or the aromatic carboxylic acids, such as, for example, 2,4-dichlorophenoxyacetic acid (esters), 4-chloro-2-methylphenoxy-propionic esters, MCPA or 3,6-dichloro-2-methoxybenzoic acid (esters);
(8) active compounds of the type of the pyrimidines, such as "fenclorim";
(9) active compounds of the type of the dichloroacetamides, which are frequently used as pre-emergence safeners (soil-acting safeners), such as, for example, "dichlormid" (-N,N-diallyl-2,2-dichloroacetamide), "R-29148" (3-dichloroacetyl-2,2,5-trimethyl-1,3-oxazolidone from Stauffer), "benoxacor" (4-dichloroacetyl-3,4-dihydro-3-methyl-2H-1,4-benzoxazine), "PPG-1292" (—N-allyl-N-[(1,3-dioxolan-2-yl)methyl] dichloroacetamide from PPG Industries), "DK-24" (—N-allyl-N-[(allylaminocarbonyl)methyl]dichloroacetamide from Sagro-Chem), "AD-67" or "MON 4660" (3-dichloroacetyl-1-oxa-3-azaspiro[4,5]decane from Nitrokemia or Monsanto), "dicyclonon" or "BAS145138" or "LAB145138" ((3-dichloroacetyl-2,5,5-tri-methyl-1,3-diazabicyclo[4.3.0]nonane from BASF) and "furilazol" or "MON 13900" ((RS)-3-dichloroacetyl-5-(2-furyl)-2,2-dimethyloxazolidone);
(10) active compounds of the type of the dichloroacetone derivatives, such as, for example, "MG 191" (CAS-Reg. No. 96420-72-3) (2-dichloromethyl-2-methyl-1, 3-dioxolane from Nitrokemia);
(11) active compounds of the type of the oxyimino compounds, such as, for example, "oxabetrinil" ((Z)-1,3-dioxolan-2-ylmethoxyimino-(phenyl)acetonitrile), "fluxofenim" (1-(4-chlorophenyl)-2,2,2-trifluoro-1-ethanone O-(1,3-dioxolan-2-ylmethyl) oxime, and "cyometrinil" or "CGA43089" ((Z)-cyanomethoxyimino-(phenyl)acetonitrile);
(12) active compounds of the type of the thiazolecarboxylic esters, which are known as seed dressings, such as, for example, "flurazole" (benzyl 2-chloro-4-trifluoromethyl-1,3-thiazole-5-carboxylate);
(13) active compounds of the type of the naphthalenedicarboxylic acid derivatives, such as, for example, "naphthalic anhydride" (1,8-naphthalenedicarboxylic anhydride);
(14) active compounds of the type of the chromanacetic acid derivatives, such as, for example, "CL 304415" (CAS-Reg. No. 31541-57-8) (2-(4-carboxychroman4-yl)acetic acid from American Cyanamid);
(15) active compounds which, in addition to a herbicidal action against harmful plants, also have safener action on crop plants such as, for example, "dimepiperate" or "MY-93" (—S-1-methyl-1-phenylethyl piperidine-1-thiocarboxylate), "daimuron" or "SK 23" (1-(1-methyl-1-phenylethyl)-3-p-tolyl-urea), "cumyluron" or "JC-940" (3-(2-chlorophenylmethyl)-1-(1-methyl-1-phenyl-ethyl)urea, see JP-A-60087254), "methoxyphenone" or "NK 049" (3,3'-dimethyl-4-methoxybenzophenone), "CSB" (1-bromo-4-(chloromethylsulfonyl)benzene) (CAS-Reg No. 54091-06-4 from Kumiai).

Preferred herbicide safeners for use in the present invention include benoxacor, BCS (1-bromo-4-[(chloromethyl) sulfonyl]benzene), cloquintocet-mexyl, cyometrinil, cyprosulfamide, dichlormid, dicyclonon, 2-(dichloromethyl)-2-methyl-1,3-dioxolane (MG 191), dietholate, fenchlorazole-ethyl, fenclorim, flurazole, fluxofenim, furilazole, isoxadifen-ethyl, jiecaowan, jiecaoxi, mefenpyr, mefenpyr-ethyl, methoxyphenone ((4-methoxy-3-methylphenyl)(3-methylphenyl)methanone), mephenate, naphthalic anhydride and oxabetrinil.

The liquid composition of the invention may comprise any of the sulfonylureas described herein with any suitable safener described herein. Exemplary combinations of sulfonylurea and safener include: iodosulfuron-methyl (optionally as the sodium salt) and mefenpyr-diethyl; mesosulfuron (and/or as the methyl ester) and mefenpyr-di-ethyl; mesosulfuron (and/or as the methyl ester) and propoxycarbazone (e.g. sodium salt) and mefenpyr-di-ethyl.

4.6.3 Other Salts

The liquid composition of the invention may comprise further salts such as those disclosed in PCT/EP2015/080844. For instance, in addition to the lithium salt as described herein, the liquid composition of the invention may comprise an inorganic salt selected from the metal carbonates and metal phosphates. Preferred additional salts include those where the inorganic salt is selected from alkali metal phosphates and alkali metal carbonates or where the inorganic salt comprises a metal selected from Na, K, Ca, Mg or Al. Particularly preferred are those salts selected from $Na_3PO_4$, $K_3PO_4$, $Mg_3(PO_4)_2$, $AlPO_4$, and $Na_2CO_3$.

4.7 Co-Formulants

The composition of the invention may comprise one or more additional co-formulants such as surfactants (e.g. emulsifiers and/or dispersants), thickeners and thixotropic agents, wetting agents, anti-drift agents, adhesives, penetrants, preservatives, antifreeze agents, antioxidants, solubilizers, fillers, carriers, colorants, antifoams, fertilizers, evaporation inhibitors and agents which modify pH and viscosity. Because the lithium salts as described herein are capable of stabilising the sulfonylurea with less thickening of the sulfonylurea-containing composition, the present invention provides improved freedom to formulators to tailor the composition to particular needs. For instance, the present invention allows additional actives as well as additional co-formulants to be added that would not be suitable in compositions that might have already been thickened by the stabilising agent. In one embodiment of the invention the liquid composition comprises at least one co-formulant that is an adjuvant, such as one of those listed in the Compendium of Herbicide Adjuvants, 12th Edition, Southern Illinois University, 2014, or any earlier edition thereof. Examples of commonly used adjuvants include, but are not limited to, paraffin oil, horticultural spray oils (e.g., summer oil), methylated rape seed oil, methylated soybean oil, highly refined vegetable oil and the like, polyol fatty acid esters, polyethoxylated esters, ethoxylated alcohols, alkyl polysaccharides and blends, amine ethoxylates, sorbitan fatty acid ester ethoxylates, polyethylene glycol esters, alkylpolyglucosides and their derivatives (e.g. esters), organosilicone based surfactants, ethylene vinyl acetate terpolymers, ethoxylated alkyl aryl phosphate esters and the like.

Preferably, the liquid composition of the invention includes one or more surfactants, for example, to enable the forming an emulsion if the compositions are to be diluted with water. These surfactants can be cationic, anionic or non-ionic, but are preferably anionic or non-ionic.

Preferred non-ionic surfactants for use in this invention include: polyalkoxylated, preferably polyethoxylated, saturated and unsaturated aliphatic alcohols having 8 to 24 carbon atoms in the alkyl radical, which is derived from the corresponding fatty acids or from petrochemical products, and having 1 to 100, preferably 2 to 50, ethylene oxide units (EO), it being possible for the free hydroxyl group to be alkoxylated, which are commercially available, for example, as Genapol® X and Genapol® 0 series (Clariant), Crovol® M series (Croda) or as Lutensol® series (BASF); polyalkoxylated, preferably polyethoxylated, arylalkylphenols, such as, for example, 2,4,6-tris(1-phenylethyl)phenol (tristyrylphenol) having an average degree of ethoxylation of between 10 and 80, preferably from 16 to 40, such as, for example, Soprophor® BSU (Rhodia) or HOE S 3474 (Clariant); polyalkoxylated, preferably polyethoxylated, alkylphenols having one or more alkyl radicals, such as, for example, nonylphenol or tri-sec-butylphenol, and a degree of ethoxylation of between 2 and 40, preferably from 4 to 15, such as, for example, Arkopal® N series or Sapogenat® T series (Clariant); polyalkoxylated, preferably polyethoxylated, hydroxyfatty acids or glycerides which contain hydroxyfatty acids, such as, for example, ricinine or castor oil, having a degree of ethoxylation of between 10 and 80, preferably from 25 to 40, such as, for example, the Emulsogen® EL series (Clariant) or the Agnique® CSO series (Cognis); polyalkoxylated, preferably polyethoxylated, sorbitan esters, such as, for example, Atplus® 309 F (Uniqema) or the Alkamuls® series (Rhodia); polyalkoxylated, preferably polyethoxylated, amines, such as, for example, Genamin® series (Clariant), Imbentin® CAM series (Kolb) or Lutensol® FA series (BASF); di- and tri-block copolymers, for example from alkylene oxides, for example from ethylene oxide and propylene oxide, having average molar masses between 200 and 10 000, preferably from 1000 to 4000 g/mol, the proportion by mass of the polyethoxylated block varying between 10 and 80%, such as, for example, the Genapol® PF series (Clariant), the Pluronic® series (BASF), or the Synperonic® PE series (Uniqema).

Preferred ionic surfactants for use in this invention include: polyalkoxylated, preferably polyethoxylated, surfactants which are ionically modified, for example by conversion of the terminal free hydroxyl function of the polyethylene oxide block into a sulfate or phosphate ester (for example as alkali metal and alkaline earth metal salts), such as, for example, Genapol® LRO or dispersant 3618 (Clariant), Emulphor® (BASF) or Crafol® AP (Cognis); alkali metal and alkaline earth metal salts of alkylarylsulfonic acids having a straight-chain or branched alkyl chain, such as phenylsulfonate CA or phenylsulfonate CAL (Clariant), Atlox® 3377BM (ICI), or the Empiphos® TM series (Huntsman); polyelectrolytes, such as lignosulfonates, condensates of naphthalenesulfonate and formaldehyde, polystyrenesulfonate or sulfonated unsaturated or aromatic polymers (polystyrenes, polybutadienes or polyterpenes), such as the Tamol® series (BASF), Morwet® D425 (Witco), the Kraftsperse® series (Westvaco) or the Borresperse® series (Borregard).

Surfactants that can also be used in the present invention include organo-modified siloxanes (OMS) such as those disclosed in the Compendium of Herbicide Adjuvants, 12th Edition, Southern Illinois University, 2014, or any earlier edition thereof, as well as those disclosed in WO 2008/155108 A2 (GAT Microencapsulation), as well as the polyether-polysiloxane copolymers described in GB 2496643 (Rotam Agrochem), including those available from Evonik Industries under the trade names Break-Thru 9902™, Break-Thru 9903™, Break-Thru 5503™, Break-Thru 9907™ and Break-Thru 9908™.

If the liquid composition of the invention comprises one or more surfactants then the surfactant is preferably included in an amount of at least 1 wt. % with respect to the total weight of the composition. More preferably, the surfactant is comprised in an amount of at least 2 wt. %, at least 5 wt. %, at least 10 wt. %, at least 15 wt. %, or at least 20 wt. %. The surfactant is preferably comprised in the composition an amount of 60 wt. % or less. More preferably, the surfactant is comprised in an amount of 50 wt. % or less, 40 wt. % or less, or 30 wt. % or less. Any of the disclosed wt. % lower limits for the amount of surfactant can be combined with any of the disclosed wt. % upper limits to define further suitable wt. % ranges for the purposes of this invention. As an example, further exemplary ranges for the amount of surfactant in the liquid composition include 1 to 60 wt. %, 2 to 50 wt. %, 5 to 40 wt. %, 10 to 30 wt. %, 5 to 50 wt. % and 2 to 40 wt. %. Where more than one surfactant is used the preferred ranges refer to the total amount of surfactant present in the liquid composition.

4.8 Method of Preparation

The composition of the invention can be prepared by known processes, for example by mixing the components and milling the suspended solids or dissolving the solids. Thus, it is possible, for example, to prepare a premix by dissolving soluble auxiliaries and additives in the non-aqueous solvent system. Any soluble agrochemically active compounds used can also be dissolved in the premix. Once the dissolution process has ended, solid sulfonylurea, any other insoluble agrochemically active compounds used and the lithium salts can be suspended in the mixture. The coarse suspension is, if appropriate after pregrinding, subjected to fine grinding. In another embodiment, solid sulfonylurea and, if appropriate, any insoluble components used are suspended in the non-aqueous solvent system and subjected to grinding. Any soluble active compounds used and any auxiliaries and additives which do not require grinding or are not required for the grinding process can be added after grinding.

To prepare the mixtures, it is possible to use customary mixing apparatus which, if required, are thermostatted. For pre-grinding, it is possible to use, for example, high-pressure homogenizers or mills operating by the rotor-stator principle, such as Ultraturrax homogenizers, for example those from IKA, or toothed colloid mills, for example from Puck or Fryma. For fine grinding, it is possible to use, for example, bead mills which operate batchwise, for example from Drais, or bead mills which operate continuously, for example from Bachofen or Eiger.

4.9 Chemical Stability

The invention is concerned with improving chemical stability of a sulfonylurea herbicide in liquid composition comprising a non-aqueous solvent system. Improved chemical stability may be achieved by including, in the liquid composition, at least one inorganic or $C_1$-$C_{12}$ organic lithium salt as discussed herein. The sulfonyl urea, the lithium salt and the non-aqueous solvent system (as well as any other components in the composition) can be selected to meet desired needs such as to ensure that the liquid composition conforms with one or more local regulatory requirements.

In one aspect of the invention, the sulfonyl urea, the lithium salt and the non-aqueous solvent system are selected such that the sulfonyl urea exhibits at least 85% chemical stability.

Preferably, the sulfonyl urea exhibits at least 90% chemical stability, more preferably at least 95% chemical stability, and still more preferably at least 98% chemical stability. Chemical stability can be determined as a percentage of the sulfonyl urea remaining (e.g. as determined by HPLC) when the liquid composition (e.g. a 50 ml sample of the liquid composition in a 60 ml hermetically sealed Winchester bottle) has been stored at 54° C. for two weeks relative to a corresponding control sample that has been stored at −10° C. for two weeks.

In another aspect of the invention, the liquid composition is one where chemical stability of the sulfonyl urea is improved by at least 2% compared to a corresponding liquid composition that does not contain a lithium salt according to the invention (instead of salt, an equivalent extra wt. % of solvent is used). Chemical stability of the sulfonylurea for each of the salt-containing liquid composition and the non-salt control composition can be determined as described immediately above. The difference in chemical stability can then be calculated to determine that an improvement of at least 2% is achieved. Preferably, the sulfonyl urea exhibits at least a 5% improvement, more preferably at least a 10% improvement, and even more preferably at least a 50% improvement in chemical stability.

Since the invention is particularly suited to improving the chemical stability of sulfonylureas that are typically considered to be unstable in liquid compositions (e.g. iodosulfuron-methyl or halosulfuron-methyl), in still a further aspect of the invention the liquid composition is one where the sulfonyl urea exhibits at least 85% chemical stability (as described above), and is one where the chemical stability of the sulfonyl urea is improved by at least 10% compared to a corresponding liquid composition that does not contain a lithium salt according to the invention (as described above). In this aspect it is preferable that the sulfonyl urea exhibits at least 90% chemical stability, more preferably at least 95% chemical stability, and even more preferably at least 98% chemical stability.

In each of the above aspects, where the liquid composition comprises more than one sulfonyl urea, the chemical stability, or improvement thereon, is determined based on the total amount of sulfonylurea herbicide in the composition.

4.10 Application of the Composition

The composition of the invention can be applied directly or can be diluted with water and then applied to plant foliage and/or soil by methods commonly employed in the art, such as conventional high-volume hydraulic sprays, low-volume sprays, air-blast, and aerial sprays. The diluted composition may be applied to the plant foliage or to the soil or area adjacent to the plant. The selection of the specific herbicidal compounds in the composition (both sulfonylureas and non-sulfonylureas) and their rates and mode of application are determined by the selectivity of the herbicidal compounds to specific crops and by the prevalent weed species to be controlled and are known to those skilled in the art (e.g. see *"The Pesticide Manual"* (ISBN-10: 190139686X) and all earlier editions thereof).

4.11 Further Exemplary Liquid Compositions of the Invention

While not intending to be limiting in any way, some further embodiments of the liquid compositions of the invention are as follows:

(i) An oil dispersion (OD) comprising a suspension of lithium acetate and at least one sulfonylurea in a non-aqueous solvent system, wherein the at least one sulfonylurea is selected from metsulfuron, halosulfuron, iodosulfuron, pyrazosulfuron, amidosulfuron, or esters and/or salts thereof.

(ii) An oil dispersion (OD) comprising a suspension of lithium carbonate and iodosulfuron or esters and/or salts thereof in a non-aqueous solvent system.

(iii) An oil dispersion (OD) comprising a suspension of lithium formate and iodosulfuron or esters and/or salts thereof in a non-aqueous solvent system.

(iv) An oil dispersion (OD) comprising a suspension of lithium chloride and iodosulfuron or esters and/or salts thereof in a non-aqueous solvent system.

(v) An oil dispersion (OD) comprising a suspension of lithium citrate and iodosulfuron or esters and/or salts thereof in a non-aqueous solvent system.

(vi) An emulsifiable concentrate (EC) comprising lithium acetate and at least one sulfonylurea in a non-aqueous solvent system, wherein the at least one sulfonylurea is selected from metsulfuron, halosulfuron, iodosulfuron, pyrazosulfuron, amidosulfuron, or esters and/or salts thereof.

(vii) An emulsifiable concentrate (EC) comprising lithium carbonate and iodosulfuron or esters and/or salts thereof in a non-aqueous solvent system.

(viii) An emulsifiable concentrate (EC) comprising lithium formate and iodosulfuron or esters and/or salts thereof in a non-aqueous solvent system.

(ix) An emulsifiable concentrate (EC) comprising lithium chloride and iodosulfuron or esters and/or salts thereof in a non-aqueous solvent system.

(x) An emulsifiable concentrate (EC) comprising lithium citrate and iodosulfuron or esters and/or salts thereof in a non-aqueous solvent system.

(xi) An soluble concentrate (SL) comprising lithium acetate and at least one sulfonylurea in a non-aqueous solvent system, wherein the at least one sulfonylurea is selected from metsulfuron, halosulfuron, iodosulfuron, pyrazosulfuron, amidosulfuron, or esters and/or salts thereof.

(xii) An soluble concentrate (SL) comprising lithium carbonate and iodosulfuron or esters and/or salts thereof in a non-aqueous solvent system.

(xiii) An soluble concentrate (SL) comprising lithium formate and iodosulfuron or esters and/or salts thereof in a non-aqueous solvent system.

(xiv) An soluble concentrate (SL) comprising lithium chloride and iodosulfuron or esters and/or salts thereof in a non-aqueous solvent system.

(xv) An soluble concentrate (SL) comprising lithium citrate and iodosulfuron or esters and/or salts thereof in a non-aqueous solvent system.

(xvi) The liquid composition according to any one of embodiments (i) to (xv) above, wherein metsulfuron is metsulfuron-methyl (optionally as the sodium salt), halosulfuron is halosulfuron-methyl, iodosulfuron is iodosulfuron-methyl (optionally as the sodium salt), and pyrazosulfuron is pyrazosulfuron-ethyl.

(xvii) The liquid composition according to any one of embodiments (i) to (xvi) above, wherein the sum amount of sulfonylurea in the compositions is from 0.1 to 60 wt. %, preferably from 1 to 20 wt. %, and more preferably from 5 to 15 wt. %.

(xviii) The liquid composition according to any one of embodiments (i) to (xvii) above, wherein the amount of lithium acetate (embodiments (i), (vi), (xi)) or lithium carbonate (embodiments (ii), (vii), (xii)) or lithium formate (embodiments (iii), (viii), (xiii)) or lithium chloride (embodiments (iv), (ix), (xiv)) or lithium citrate (embodiments (v), (x), (xv)) in the liquid composition is from 0.01 to 30 wt. %, preferably from 1 to 20 wt. %, and more preferably from 5 to 15 wt. %.

(xix) The liquid composition according to any one of embodiments (i) to (xviii) above, wherein the weight ratio of the lithium salt to the sum amount of sulfonylurea is from 0.1 to 5, preferably from 0.3 to 3, and more preferably from 0.5 to 2.

(xx) The liquid composition according to any one of embodiments (i), (vi), (xi) comprising:
  5 to 15 wt. % of metsulfuron-methyl (optionally as the sodium salt) or halosulfuron-methyl or iodosulfuron-methyl (optionally as the sodium salt) or pyrazosulfuron-ethyl or amidosulfuron; and
  5 to 15 wt. % of lithium acetate.

(xxi) The liquid composition according to any one of embodiments (ii), (vii), (xii) comprising:
  5 to 15 wt. % of iodosulfuron-methyl (optionally as the sodium salt); and
  5 to 15 wt. % of lithium carbonate.

(xxii) The liquid composition according to any one of embodiments (iii), (viii), (xiii) comprising:
  5 to 15 wt. % of iodosulfuron-methyl (optionally as the sodium salt); and
  5 to 15 wt. % of lithium formate.

(xxiii) The liquid composition according to any one of embodiments (iv), (ix), (xiv) comprising:
  5 to 15 wt. % of iodosulfuron-methyl (optionally as the sodium salt); and
  5 to 15 wt. % of lithium chloride.

(xxiv) The liquid composition according to any one of embodiments (v), (x), (xv) comprising:
  5 to 15 wt. % of iodosulfuron-methyl (optionally as the sodium salt); and
  5 to 15 wt. % of lithium citrate.

Any of the exemplary embodiments (i) to (xxiv) as listed above can be further modified in line with the general description provided herein. By way of example, in any of the exemplary embodiments (i) to (xxiv), the sulfonylurea can be replaced with any other sulfonylurea disclosed herein and the salt can be replaced with any other salt disclosed herein in accordance with the invention. For example, in any of the exemplary embodiments (i) to (xxiv), the sulfonylurea can be replaced with iodosulfuron methyl (optionally as the sodium salt) and the salt can be replaced with lithium acetate, or lithium benzoate, or lithium octanoate, or lithium salicylate. Likewise, in any of the exemplary embodiments (i) to (xxiv), the lithium salt can be replaced with lithium octanoate and the sulfonylurea can be replaced with foramsulfuron, or chlorsulfuron, or pyrazosulfuron-ethyl, or amidosulfuron, or halosulfuron-methyl, or iodosulfuron-methyl (optionally as the sodium salt).

By way of further example, the sum amount of sulfonylurea in any of the exemplary embodiments (i) to (xxiv) can be set from 1 to 50wt. %, 2 to 40 wt. %, 5 to 30 wt. %, 0.5 to 20 wt. %, 7 to 30 wt. %, and 5 to 10 wt. %. By way of a further example, the total amount of lithium salt that is present in the exemplary embodiments (i) to (xxiv) can be from 0.1 to 25 wt. %, 1 to 20 wt. %, 1 to 10 wt. %, 0.5 to 10 wt. %, 1 to 5 wt. % and 0.5 to 5 wt. %. By way of a still further example, the weight ratio of the total amount of lithium salt recited in the embodiments above to the total amount of recited sulfonylurea can be from 0.2 to 4, 0.3 to 3, 0.5 to 2, 0.7 to 2, 0.1 to 2, 1 to 2 and 1 to 5. By way of a further example, any of the exemplary embodiments including metsulfuron or metsulfuron-methyl (in both cases, optionally as the sodium salt) can further comprise fluroxypyr-meptyl as a non-sulfonylurea. By way of still a further example, the lithium salt in any of the above embodiments (i) to (xxiv) can be replaced with another lithium salt as described herein, for example, lithium octanoate or lithium benzoate. Any of the exemplary embodiments (i) to (xxiv) or as described herein can further comprise a surfactant and/or a safener.

5. EXAMPLES

The oil dispersions described in the following examples were prepared as follows.
(i) Preparation of a 25 wt. % Sulfonylurea Millbase
Sulfonylurea was added to a solvent in an amount of 25 wt. %. The mixture was placed in a mill (Eiger Torrance Mini Mill) containing glass beads (1.0-1.25 mm). The suspension was then milled to provide a 25 wt. % sulfonylurea millbase having a particle size (D50) between 2 and 3 μm.

(ii) Preparation of a 25 wt. % Lithium Salt Millbase

Lithium salt was added to solvent in an amount of 25 wt. % and milled as described above to provide a 25 wt. % lithium salt millbase having a particle size (D50) between 2 and 3 μm.

(iii) Preparation of the Oil Dispersion

An appropriate amount of the milled concentrate of sulfonylurea (i) was blended with solvent (optionally containing surfactant) until homogenous, and then further blended with milled concentrate of lithium salt (ii) until homogenous, resulting in the oil dispersions as described in the tables below.

The liquid formulations were stored in tightly closed glass bottles in thermostatically controlled incubators at 54° C. for two weeks with control samples stored at −10° C. After storage, all formulations were analysed for active ingredient content(s) by HPLC. Stability is reported with respect to the amount of active ingredient remaining relative to a corresponding sample stored at −10° C. for two weeks.

Example 1—Effect of a Lithium Salt on SU Stabilisation

Oil dispersions of iodosulfuron-methyl sodium salt (IMS) with or without added acetate salt were prepared and tested to determine the chemical stability of the sulfonylurea after storage at 54° C. for two weeks. The results are summarised in Table 1 below.

TABLE 1

|  | Example | Comparative Examples | | | |
|---|---|---|---|---|---|
|  | OD1 | OD2 | OD3 | OD4 | OD5 |
| Components (wt. %) | | | | | |
| IMS | 10 | 10 | 10 | 10 | 10 |
| lithium acetate | 10 | | | | |
| sodium acetate | | 10 | | | |
| potassium acetate | | | 10 | | |
| magnesium acetate | | | | 10 | |
| Atlas G1086 | 14 | 14 | 14 | 14 | 14 |
| Nansa EVM 70/2E | 6 | 6 | 6 | 6 | 6 |
| isobornyl acetate | to 100 | to 100 | to 100 | to 100 | to 100 |
| Stability (%) | 99.4 | 84.5 | 55.6 | 54.7 | 74.1 |

The chemical stability of a sulfonylurea-containing oil dispersion comprising lithium acetate (OD1) is superior to that of a corresponding oil dispersion comprising sodium acetate (OD2), potassium acetate (OD3), magnesium acetate (OD4) or no salt (OD5).

Example 2—Effect of Various Co-Formulated Lithium Salts on SU Stabilisation

Oil dispersions of iodosulfuron-methyl sodium (IMS) with or without added lithium and sodium salts were prepared and tested to determine the chemical stability of the sulfonylurea after storage at 54° C. for two weeks. The results are summarised in Table 2-1 and Table 2-2 below.

TABLE 2-1

|  | Examples | | | | | Comparative Examples | | | | |
|---|---|---|---|---|---|---|---|---|---|---|
|  | OD 6 | OD 7 | OD 8 | OD 9 | OD 10 | OD 11 | OD 12 | OD 13 | OD 14 | OD 15 |
| Components (wt. %) | | | | | | | | | | |
| IMS | 10 | 10 | 10 | 10 | 10 | 10 | 10 | 10 | 10 | 10 |
| lithium formate | 10 | | | | | | | | | |
| lithium acetate | | 10 | | | | | | | | |
| lithium citrate | | | 10 | | | | | | | |
| lithium octanoate | | | | 10 | | | | | | |
| lithium benzoate | | | | | 10 | | | | | |
| sodium formate | | | | | | 10 | | | | |
| sodium acetate | | | | | | | 10 | | | |
| sodium citrate | | | | | | | | 10 | | |
| sodium octanoate | | | | | | | | | 10 | |
| sodium benzoate | | | | | | | | | | 10 |
| Atlas G1086 | 14 | 14 | 14 | 14 | 14 | 14 | 14 | 14 | 14 | 14 |
| Nansa EVM 70/2E | 6 | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 | to 100 |
| Stability (%) | 96.5 | 99.4 | 97.1 | 98.6 | 98.5 | 82.9 | 84.5 | 78.9 | 86.0 | 81.7 |

TABLE 2-2

|  | Examples | | | Comparative Examples | | |
|---|---|---|---|---|---|---|
|  | OD 16 | OD 17 | OD 18 | OD 19 | OD 20 | OD 21 |
| Components (wt. %) | | | | | | |
| IMS | 10 | 10 | 10 | 10 | 10 | 10 |
| lithium carbonate | 10 | | | | | |
| lithium chloride | | 10 | | | | |
| lithium sulphate | | | 10 | | | |
| sodium carbonate | | | | 10 | | |
| sodium chloride | | | | | 10 | |
| sodium sulphate | | | | | | 10 |
| Atlas G1086 | 14 | 14 | 14 | 14 | 14 | 14 |
| Nansa EVM 70/2E | 6 | 6 | 6 | 6 | 6 | 6 |
| isobornyl acetate | to 100 | to 100 | to 100 | to 100 | to 100 | to 100 |
| Stability (%) | 98.2 | 78.3 | 90.4 | 82.6 | 72.5 | 74.5 |

The chemical stability of a sulfonylurea-containing oil dispersions comprising a lithium salt (OD6-OD10; OD16-OD18) is superior to a oil dispersion with the corresponding sodium salt (OD11-OD15; OD19-OD21), irrespective if the salt is an organic salt (Table 2-1) or an inorganic salt (Table 2-2). Stability without any salt after storage at 54° C. for two weeks is 74.1% (see OD5 in Table 1). Thus, while sodium salts can improve stability of the sulfonylurea, the corresponding lithium salt improves stability to an even greater extent.

Example 3—Various Sulfonylureas can be Stabilised with a Lithium Salt

Oil dispersions of various sulfonylureas with or without added lithium acetate salt were prepared and tested to determine the chemical stability of the sulfonylurea after storage at 54° C. for two weeks. The results are summarised in Table 3 below.

TABLE 3

|  | Examples | | | | | Comparative Examples | | | | |
| --- | --- | --- | --- | --- | --- | --- | --- | --- | --- | --- |
|  | OD 22 | OD 23 | OD 24 | OD 25 | OD 26 | OD 27 | OD 28 | OD 29 | OD 30 | OD 31 |
| Components (wt. %) | | | | | | | | | | |
| metsulfuron methyl | 5 | | | | | 5 | | | | |
| halosulfuron-methyl | | 10 | | | | | 10 | | | |
| IMS | | | 10 | | | | | 10 | | |
| pyrazosulfuron-ethyl | | | | 5 | | | | | 5 | |
| amidosulfuron | | | | | 5 | | | | | 5 |
| lithium acetate | 5 | 10 | 10 | 5 | 5 | — | — | — | — | — |
| Soprophor BSU | 20 | | | 20 | 20 | 20 | | | 20 | 20 |
| Atlas G1086 | | 14 | 14 | | | | 14 | 14 | | |
| Nansa EVM 70/2E | | 6 | 6 | | | | 6 | 6 | | |
| isobornyl acetate | to 100 | to 100 | to 100 | to 100 | to 100 | to 100 | to 100 | to 100 | to 100 | to 100 |
| Stability (%) | 100 | 83.9 | 99.4 | 84 | 91 | 85.7 | 77.1 | 74.1 | 79 | 85 |

The chemical stability of a sulfonylurea-containing oil dispersions comprising an inorganic acid salt of lithium (OD22-OD26) were found to be superior to corresponding oil dispersions with no co-formulated lithium salt (OD27-OD31). Improved stability is achieved for different amounts of sulfonylurea, different amounts of lithium salt, and different surfactant systems.

Example 4—Effect of Co-Formulated Lithium Carbonate Salt on SU Stabilisation Oil dispersions of iodosulfuron-methyl sodium salt or halosulfuron-methyl with or without added lithium carbonate salt were prepared and tested to determine the chemical stability of the sulfonylurea after storage at 54° C. for two weeks. The results are summarised in Table 4 below.

TABLE 4

|  | Examples | | Comparative Examples | |
| --- | --- | --- | --- | --- |
|  | OD32 | OD33 | OD34 | OD35 |
| Components (wt. %) | | | | |
| iodosulfuron-methyl sodium salt | 10 | | 10 | |
| halosulfuron-methyl | | 10 | | 10 |
| lithium carbonate | 10 | 10 | — | — |
| Atlas G1086 | 14 | 14 | 14 | 14 |
| Nansa EVM 70/2E | 6 | 6 | 6 | 6 |
| isobornyl acetate | to 100 | to 100 | to 100 | to 100 |
| Stability (%) | 98.2 | 87.5 | 74.1 | 77.1 |

The chemical stability of sulfonylurea-containing oil dispersions comprising an inorganic acid salt of lithium (OD32 and OD33) were found to be superior to oil dispersions with no co-formulated lithium salt (OD34 and OD35).

Example 5—Comparison of a Li C8-Organic Acid Salt and a Li C16-Organic Acid Salt for Various Sulfonylureas Oil dispersions of various sulfonylureas with or without added lithium octanoate and lithium 12-hydroxystearate were prepared and tested to determine the chemical stability of the sulfonylurea after storage at 54° C. for two weeks. The results are summarised in Table 5-1 (with salt) and Table 5-2 (no salt) below.

TABLE 5-1

| | Examples | | | | | Comparative Examples | | | | |
|---|---|---|---|---|---|---|---|---|---|---|
| | OD 36 | OD 37 | OD 38 | OD 39 | OD 40 | OD 41 | OD 42 | OD 43 | OD 44 | OD 45 |
| Components (wt. %) | | | | | | | | | | |
| foramsulfuron | 10 | | | | | 10 | | | | |
| chlorsulfuron | | 10 | | | | | 10 | | | |
| pyrazosulfuron-ethyl | | | 10 | | | | | 10 | | |
| amidosulfuron | | | | 10 | | | | | 10 | |
| halosulfuron-methyl | | | | | 10 | | | | | 10 |
| lithium octanoate | 10 | 10 | 10 | 10 | 10 | — | — | — | — | — |
| Lithium 12-hydroxystearate | — | — | — | — | — | 10 | 10 | 10 | 10 | 10 |
| Atlas G1086 | 14 | 14 | 14 | 14 | 14 | 14 | 14 | 14 | 14 | 14 |
| Nansa EVM 70/2E | 6 | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 | to 100 |
| Stability (%) | 90.9 | 90.0 | 99.7 | 99.1 | 98.3 | 71.3 | 62.1 | 90.1 | 90.1 | 48.0 |

TABLE 5-2

| | Comparative Examples | | | | |
|---|---|---|---|---|---|
| | OD 46 | OD 47 | OD 48 | OD 49 | OD 50 |
| Components (wt. %) | | | | | |
| foramsulfuron | 10 | | | | |
| chlorsulfuron | | 10 | | | |
| pyrazosulfuron-ethyl | | | 10 | | |
| amidosulfuron | | | | 10 | |
| halosulfuron-methyl | | | | | 10 |
| lithium octanoate | — | — | — | — | — |
| lithium 12-hydroxystearate | — | — | — | — | — |
| Atlas G1086 | 14 | 14 | 14 | 14 | 14 |
| Nansa EVM 70/2E | 6 | 6 | 6 | 6 | 6 |
| isobornyl acetate | to 100 | to 100 | to 100 | to 100 | to 100 |
| Stability (%) | 82.3 | 86.4 | 91.9 | 93.5 | 77.1 |

The chemical stability of sulfonylurea-containing oil dispersions comprising a C8 organic acid salt of lithium (OD36-OD40) were found to be superior to corresponding oil dispersions with the C16 organic acid salt of lithium of WO 2013/174833 (OD41-OD45) as well as corresponding oil dispersions with no salt (OD46-OD50). A comparison of OD23 (Table 3), OD33 (Table 4) and OD45 (Table 5-1) shows that lithium acetate and lithium carbonate also provide a superior stabilising effect than lithium 12-hydroxystearate.

Example 6—Comparison of a Li C8-Organic Acid Salt and a Li C16-Organic Acid Salt at Various Concentrations Oil dispersions of halosulfuron-methyl with or without added lithium octanoate and lithium 12-hydroxystearate at various concentrations were prepared and tested to determine the chemical stability of the sulfonylurea after storage at 54° C. for two weeks. The results are summarised in Table 6-1 and Table 6-2 below.

TABLE 6-1

| | Examples | | | | | Comparative Examples | | | | |
|---|---|---|---|---|---|---|---|---|---|---|
| | OD 51 | OD 52 | OD 53 | OD 54 | OD 55 | OD 56 | OD 57 | OD 58 | OD 59 | OD 60 |
| Components (wt. %) | | | | | | | | | | |
| halosulfuron-methyl | 10 | 5 | 2.5 | 1 | 1 | 10 | 5 | 2.5 | 1 | 1 |
| lithium octanoate | 10 | 5 | 2.5 | 2 | 1 | — | — | — | — | — |
| Lithium 12-hydroxystearate | — | — | — | — | — | 10 | 5 | 2.5 | 2 | 1 |
| Atlas G1086 | 14 | 14 | 14 | 14 | 14 | 14 | 14 | 14 | 14 | 14 |
| Nansa EVM 70/2E | 6 | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 | to 100 |
| Stability (%) | 98.3 | 98.6 | 98.1 | 96.3 | 95.7 | 48.0 | 24.3 | 40.8 | 34.8 | 43.1 |

TABLE 6-2

|  | Comparative Examples | | | |
|---|---|---|---|---|
|  | OD 61 | OD 62 | OD 63 | OD 64 |
| Components (wt. %) | | | | |
| halosulfuron-methyl | 10 | 5 | 2.5 | 1 |
| lithium octanoate | — | — | — | — |
| lithium 12-hydroxystearate | — | — | — | — |
| Atlas G1086 | 14 | 14 | 14 | 14 |
| Nansa EVM 70/2E | 6 | 6 | 6 | 6 |
| isobornyl acetate | to 100 | to 100 | to 100 | to 100 |
| Stability (%) | 77.1 | 54.1 | 38.2 | 29.0 |

From Table 6-2 it can be seen that the chemical stability of halosulfuron-methyl decreases as its amount in the OD decreases (OD61-OD64). Adding a C8 organic acid salt of lithium (OD51-OD55) improves chemical stability at all concentrations tested (see Table 6-1) and to a greater degree than that achieved with a C16 organic acid salt of lithium (OD56-OD60 of Table 6-1).

Example 7—Comparison of Various Li Organic Acid Salts for Stabilising Low-Concentration iodosulfuron-methyl Sodium Salt Oil dispersions having a low concentration (1 wt. %) iodosulfuron-methyl sodium salt (IMS) with or without added lithium salts were prepared and tested to determine the chemical stability of the sulfonylurea after storage at 54° C. for two weeks. The results are summarised in Table 7 below.

TABLE 7

|  | Examples | | | | Comparative Examples | |
|---|---|---|---|---|---|---|
|  | OD 65 | OD 66 | OD 67 | OD 68 | OD 69 | OD 70 |
| Components (wt. %) | | | | | | |
| IMS | 1 | 1 | 1 | 1 | 1 | 1 |
| lithium acetate | 1 | | | | | |
| lithium benzoate | | 1 | | | | |
| lithium octanoate | | | 1 | | | |
| lithium salicylate | | | | 1 | | |
| lithium 12-hydroxystearate | | | | | 1 | |
| Atlas G1086 | 14 | 14 | 14 | 14 | 14 | 14 |
| Nansa EVM 70/2E | 6 | 6 | 6 | 6 | 6 | 6 |
| isobornyl acetate | to 100 | to 100 | to 100 | to 100 | to 100 | to 100 |
| Stability (%) | 95.3 | 95.0 | 87.6 | 81.8 | 77.9 | 60.5 |

The chemical stability of sulfonylurea-containing oil dispersions comprising a lithium salt according to the invention (OD65-OD68) were found to be superior to corresponding oil dispersions with the C16 organic acid salt of lithium (OD69) as well as a corresponding oil dispersion with no salt (OD70).

Example 8—Comparison of Various Li Organic Acid Salts for Stabilising Low-Concentration iodosulfuron-methyl Sodium Salt in a Solvesso Liquid System Oil dispersions having a low concentration (0.5 wt. %) iodosulfuron-methyl sodium salt (IMS) with or without added lithium salts were prepared and tested to determine the chemical stability of the sulfonylurea after storage at 54° C. for two weeks. In this example the Solvesso solvent system that was used in Table 4 of WO 2013/174833 A1 was employed. The results are summarised in Table 8 below.

TABLE 8

|  | Examples | | | Comparative Examples | |
|---|---|---|---|---|---|
|  | OD 71 | OD 72 | OD 73 | OD 74 | OD 75 |
| Components (wt. %) | | | | | |
| IMS | 0.5 | 0.5 | 0.5 | 0.5 | 0.5 |
| lithium octanoate | 1 | | | | |
| lithium benzoate | | 1 | | | |
| lithium acetate | | | 1 | | |
| lithium 12-hydroxystearate | | | | | 1 |
| Emulsogen EL 400 | 10 | 10 | 10 | 10 | 10 |
| Ligalub PEG 400 MO | 15 | 15 | 15 | 15 | 15 |
| Solvesso 200ND | to 100 | to 100 | to 100 | to 100 | to 100 |
| Stability (%) | 85.6 | 86.5 | 83.7 | 15.4 | 63.1 |

The chemical stability of sulfonylurea-containing oil dispersions comprising a lithium salt according to the invention (OD71-OD73) were found to be superior to corresponding oil dispersions with the C16 organic acid salt of lithium (OD75) as well as a corresponding oil dispersion with no salt (OD74).

Example 9—Comparison of Various Li Organic Acid Salts for Stabilising a Mixture of Sulfonylureas Oil dispersions having a mixture of sulfonylureas with or without an added lithium salt were prepared and tested to determine the chemical stability of the sulfonylurea after storage at 54° C. for two weeks. The results are summarised in Table 9 below. The sulfonylureas are numbered 1-4 and their respective stabilities are reported using the same numbering.

TABLE 9

|  | Examples | | | Comparative Examples | | | | | |
| --- | --- | --- | --- | --- | --- | --- | --- | --- | --- |
|  | OD 76 | OD 77 | OD 78 | OD 79 | OD 80 | OD 81 | OD 82 | OD 83 | OD 84 |
| Components (wt. %) | | | | | | | | | |
| 1. iodosulfuron-methyl sodium | 5 | 5 |  | 5 | 5 |  | 5 | 5 |  |
| 2. halosulfuron-methyl | 5 |  |  | 5 |  |  | 5 |  |  |
| 3. amidosulfuron |  | 5 | 5 |  | 5 | 5 |  | 5 | 5 |
| 4. foramsulfuron |  |  | 5 |  |  | 5 |  |  | 5 |
| lithium octanoate | 10 | 10 | 10 | — | — | — | — | — | — |
| lithium 12-hydroxystearate | — | — | — | 10 | 10 | 10 | — | — | — |
| Atlas G1086 | 14 | 14 | 14 | 14 | 14 | 14 | 14 | 14 | 14 |
| Nansa EVM 70/2E | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 |
| Stability (%) 1 | 98.4 | 97.8 | — | 65.7 | 92.9 | — | 17.3 | 33.6 | — |
| Stability (%) 2 | 91.5 | — | — | 26.5 | — | — | 13.3 | — | — |
| Stability (%) 3 | — | 96.1 | 90.4 | — | 63.9 | 31.1 | — | 78.4 | 41.2 |
| Stability (%) 4 | — | — | 98.1 | — | — | 92.0 | — | — | 19.1 |

The chemical stability of mixed sulfonylurea-containing oil dispersions comprising a lithium salt according to the invention (OD76-OD78) were found to be superior to corresponding oil dispersions with the C16 organic acid salt of lithium (OD79-OD81) as well as a corresponding oil dispersion with no salt (OD82-OD84).

Example 10—Comparison of Various Li Organic Acid Salts for Stabilising a Mixture of a Sulfonylurea and a Non-Sulfonylurea Oil dispersions having a mixture of a sulfonylurea and a non-sulfonylurea with or without an added lithium salt were prepared and tested to determine the chemical stability of the sulfonylurea after storage at 54° C. for two weeks. The results are summarised in Tables 10-1 and 10-2 below. The sulfonylureas and the non-sulfonylureas are numbered and their respective stabilities are reported using the same numbering.

TABLE 10-1

|  | Examples | | | | | | Comparative Examples | | | | | |
| --- | --- | --- | --- | --- | --- | --- | --- | --- | --- | --- | --- | --- |
|  | OD 85 | OD 86 | OD 87 | OD 88 | OD 89 | OD 90 | OD 91 | OD 92 | OD 93 | OD 94 | OD 95 | OD 96 |
| Components (wt. %) | | | | | | | | | | | | |
| 1. halosulfuron-methyl | 1 | 1 | 1 | 1 | 1 | 1 | 1 | 1 | 1 | 1 | 1 | 1 |
| 2. terbuthylazine | 25 | 25 |  |  |  |  | 25 | 25 |  |  |  |  |
| 3. s-metolachlor |  |  | 32 | 32 |  |  |  |  | 32 | 32 |  |  |
| 4. fluroxypyr-meptyl |  |  |  |  | 32 | 32 |  |  |  |  | 32 | 32 |
| lithium octanoate | 1 | — | 1 | — | 1 | — | — | — | — | — | — | — |
| lithium acetate | — | 1 | — | 1 | — | 1 | — | — | — | — | — | — |
| lithium 12-hydroxystearate | — | — | — | — | — | — | 1 | — | 1 | — | 1 | — |
| Atlas G1086 | 14 | 14 | 14 | 14 | 14 | 14 | 14 | 14 | 14 | 14 | 14 | 14 |
| Nansa EVM 70/2E | 6 | 6 | 6 | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 | to 100 | to 100 | to 100 |
| Stability (%) 1 | 76.0 | 75.6 | 70.0 | 68.6 | 86.8 | 81.9 | 5.6 | 2.6 | 14.9 | 8.5 | 27.1 | 17.8 |
| Stability (%) 2 | 99.3 | 99.6 | — | — | — | — | 100.2 | 100.1 | — | — | — | — |
| Stability (%) 3 | — | — | 97.1 | 97.9 | — | — | — | — | 99.4 | 99.5 | — | — |
| Stability (%) 4 | — | — | — | — | 100.1 | 100.1 | — | — | — | — | 100.4 | 99.8 |

TABLE 10-2

| | Examples | | | | | | Comparative Examples | | | | | |
|---|---|---|---|---|---|---|---|---|---|---|---|---|
| | OD 97 | OD 98 | OD 99 | OD 100 | OD 101 | OD 102 | OD 103 | OD 104 | OD 105 | OD 106 | OD 107 | OD 108 |
| Components (wt. %) | | | | | | | | | | | | |
| 1. pyrazosulfuron-ethyl | 1 | 1 | — | — | — | — | 1 | 1 | — | — | — | — |
| 2. iodosulfuron-methyl sodium | — | — | 1 | 1 | — | — | — | — | 1 | 1 | — | — |
| 3. foramsulfuron | — | — | — | — | 1 | 1 | — | — | — | — | 1 | 1 |
| 4. pretilachlor | 32 | 32 | — | — | — | — | 32 | 32 | — | — | — | — |
| 5. diflufenican | — | — | 25 | 25 | — | — | — | — | 25 | 25 | — | — |
| 6. isoxadifen-ethyl | — | — | — | — | 25 | 25 | — | — | — | — | 25 | 25 |
| lithium octanoate | 1 | — | 1 | — | 1 | — | — | — | — | — | — | — |
| lithium acetate | — | 1 | — | 1 | — | 1 | — | — | — | — | — | — |
| lithium 12-hydroxystearate | — | — | — | — | — | — | 1 | — | 1 | — | 1 | — |
| Atlas G1086 | 14 | 14 | 14 | 14 | 14 | 14 | 14 | 14 | 14 | 14 | 14 | 14 |
| Nansa EVM 70/2E | 6 | 6 | 6 | 6 | 6 | 6 | 6 | 6 | 6 | 6 | 6 | 6 |
| isobornyl acetate | to 100 | to 100 | to 100 | to 100 | to 100 | to 100 | to 100 | to 100 | to 100 | to 100 | to 100 | to 100 |
| Stability (%) 1 | 78.1 | 91.0 | — | — | — | — | 45.6 | 39.8 | — | — | — | — |
| Stability (%) 2 | — | — | 86.6 | 87.3 | — | — | — | — | 53.6 | 31.5 | — | — |
| Stability (%) 3 | — | — | — | — | 53.2 | 26.6 | — | — | — | — | 12.4 | 8.9 |
| Stability (%) 4 | 94.3 | 92.8 | — | — | — | — | 98.7 | 99.6 | — | — | — | — |
| Stability (%) 5 | — | — | 99.7 | 100.2 | — | — | — | — | 99.9 | 100.2 | — | — |
| Stability (%) 6 | — | — | — | — | 94.8 | 98.0 | — | — | — | — | 99.4 | 99.7 |

The chemical stability of a sulfonylurea when present together with a non-sulfonylurea is improved when a lithium salt according to the invention is added as compared to a corresponding oil dispersion with the C16 organic acid salt of lithium or no salt.

Example 11—Liquid Composition

A liquid composition comprising a sulfonyl urea in a non-aqueous solvent system (N-butyl pyrrolidone) was prepared with and without an added salt and tested. The sulfonylurea was dissolved in the N-butyl pyrrolidone and the salt (milled) was dispersed as solid particles. The stability of the sulfonylurea after storage at 54° C. for two weeks is reported in Table 11 below.

TABLE 11

| | Examples | | Comparative Examples | |
|---|---|---|---|---|
| | 11-1 | 11-2 | 11-3 | 11-4 |
| Components (wt. %) | | | | |
| halosulfuron-methyl | 5 | 10 | 5 | 10 |
| lithium octanoate | 5 | 10 | — | — |
| Soprophor BSU | 3 | 3 | 3 | 3 |
| N-butyl pyrrolidone | to 100 | to 100 | to 100 | to 100 |
| Stability (%) | 43.7 | 50.4 | 0 | 0 |

The data in Table 11 demonstrates that a lithium salt according to the invention can stabilise a sulfonylurea in liquid compositions of the invention even if the sulfonylurea and salt are present in different phases.

While lithium carbonate and lithium phosphate salts can be used for the purpose of this invention, it is also envisioned that the invention can be worked with lithium salts other than lithium carbonate and lithium phosphate. Thus, it should be understood that this invention also extends to liquid herbicidal compositions comprising a non-aqueous solvent system; at least one sulfonylurea herbicide; and at least one inorganic or $C_1$-$C_{12}$ organic lithium salt, wherein the at least one lithium salt is not a lithium carbonate or a lithium phosphate. This proviso that the at least one lithium salt is not a lithium carbonate or a lithium phosphate may be applied to all disclosures herein, including the appended claims, unless of course a disclosure expressly calls for the presence of lithium carbonate and/or lithium phosphate.

The above description of the invention and included examples are intended to be illustrative and not limiting. All documents referred to herein are incorporated by reference. Various changes or modifications in the embodiments described herein may occur to those skilled in the art. These changes can be made without departing from the scope or spirit of the invention.

The invention claimed is:

1. An oil dispersion comprising:
   a non-aqueous solvent system;
   at least one sulfonylurea compound; and
   (i) at least one inorganic lithium salt that comprises one or two lithium cations, or
   (ii) at least one $C_1$-$C_{12}$ organic lithium salt that comprises one or two lithium cations and one, two, or three carboxyl groups;
   wherein the sulfonylurea compound exhibits at least 85% chemical stability when stored at 54° C. for two weeks.

2. The oil dispersion according to claim 1, wherein the sulfonylurea compound exhibits at least 95% chemical stability when stored at 54° C. for two weeks compared to a corresponding oil dispersion that does not contain the inorganic lithium salt or $C_1$-$C_{12}$ organic lithium salt that has been stored at −10° C. for two weeks.

3. The oil dispersion according to claim 1, wherein the chemical stability of the sulfonylurea compound is improved by at least 10% compared to a corresponding oil dispersion that does not contain the inorganic lithium salt or $C_1$-$C_{12}$ organic lithium salt.

4. The oil dispersion according to claim 3, wherein the chemical stability of the sulfonylurea compound is improved by at least 50% compared to a corresponding oil dispersion that does not contain the inorganic lithium salt or $C_1$-$C_{12}$ organic lithium salt.

5. The oil dispersion according to claim 1, wherein the at least one inorganic lithium salt or the at least one $C_1$-$C_{12}$ organic lithium salt has a molecular weight of 250 or less.

6. The oil dispersion according to claim 1, comprising lithium acetate, lithium carbonate, lithium formate, lithium sulphate, lithium citrate, lithium octanoate, lithium salicylate, lithium benzoate and/or lithium chloride.

7. The oil dispersion according to claim 1, wherein the lithium salt is suspended in the non-aqueous solvent system.

8. The oil dispersion according to claim 1, wherein the sulfonylurea compound is represented by Formula (1) or acids, esters, or salts thereof:

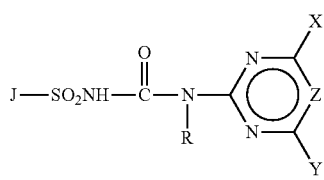

Formula (1)

wherein J is $R^{13}SO_2N(CH_3)$— or J is selected from the group consisting of

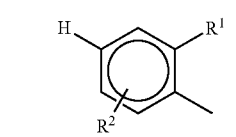 J-1

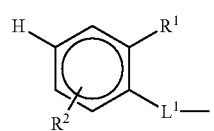 J-2

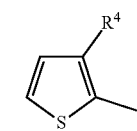 J-3

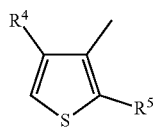 J-4

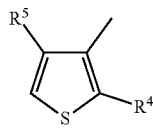 J-5

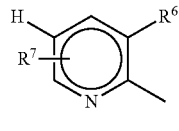 J-6

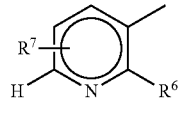 J-7

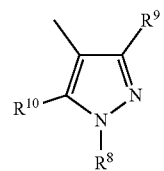 J-8

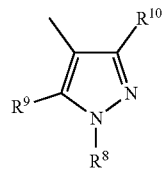 J-9

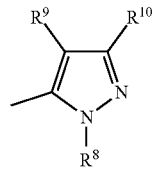 J-10

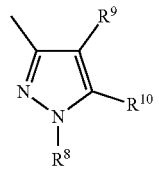 J-11

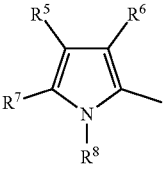 J-12

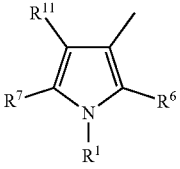 J-13

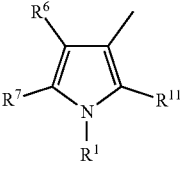 J-14

J-15 and wherein:
R is H or $CH_3$;
$R^1$ is F, Cl, Br, $NO_2$, $C_1$-$C_4$ alkyl, $C_1$-$C_4$ haloalkyl, $C_3$-$C_4$ cycloalkyl, $C_2$-$C_4$ haloalkenyl, $C_1$-$C_4$ alkoxy, $C_1$-$C_4$ haloalkoxy, $C_2$-$C_4$ alkoxyalkoxy, $CO_2R^{14}$, $C(O)NR^{15}R^{16}$, $SO2NR^{17}R^{18}$, $S(O)_nR^{19}$, $C(O)R^{20}$, $CH_2CN$ or L;
$R^2$ is H, F, Cl, Br, I, CN, $CH_3$, $OCH_3$, $SCH_3$, $CF_3$ or $OCF_2H$;

$R^3$ is Cl, $NO_2$, $CO_2CH_3$, $CO_2CH_2CH_3$, $C(O)CH_3$, $C(O)CH_2CH_3$, $C(O)$-cyclopropyl, $SO_2N(CH_3)_2$, $SO_2CH_3$, $SO_2CH_2CH_3$, $OCH_3$ or $OCH_2CH_3$;

$R^4$ is $C_1$-$C_3$ alkyl, $C_1$-$C_2$ haloalkyl, $C_1$-$C_2$ alkoxy, $C_2$-$C_4$ haloalkenyl; F, Cl, Br, $NO_2$, $CO_2R_{14}$, $C(O)NR_{15}R_{16}$, $SO_2NR_{17}R_{18}$, $S(O)nR_{19}$, $C(O)R_{20}$ or L;

$R^5$ is H, F, Cl, Br or $CH_3$;

$R^6$ is $C_1$-$C_4$ alkyl optionally substituted with 0-3 F, 0-1 Cl and 0-1 $C_3$-$C_4$ alkoxyacetyloxy, or $R^6$ is $C_1$-$C_2$ alkoxy, $C_2$-$C_4$ haloalkenyl, F, Cl, Br, $CO_2R^{14}$, $C(O)NR^{15}R^{16}$, $SO_2NR^{17}R^{18}$, $S(O)_nR^{19}$, $C(O)R^{20}$ or L;

$R^7$ is H, F, Cl, $CH_3$ or $CF_3$;

$R^8$ is H, $C_1$-$C_3$ alkyl or pyridyl;

$R^9$ is $C_1$-$C_3$ alkyl, $C_1$-$C_2$ alkoxy, F, Cl, Br, $NO_2$, $CO_2R^{14}$, $SO_2NR^{17}R^{18}$, $S(O)_nR^{19}$, $OCF_2H$, $C(O)R^{20}$, $C_2$-$C_4$ haloalkenyl or L;

$R^{10}$ is H, Cl, F, Br, $C_1$-$C_3$ alkyl or $C_1$-$C_2$ alkoxy;

$R^{11}$ is H, $C_1$-$C_3$ alkyl, $C_1$-$C_2$ alkoxy, $C_2$-$C_4$ haloalkenyl, F, Cl, Br, $CO_2R^{14}$, $C(O)NR^{15}R^{16}$, $SO_2NR^{17}R^{18}$, $S(O)_nR^{19}$, $C(O)R^{20}$ or L;

$R^{12}$ is halogen, $C_1$-$C_4$ alkyl or $C_1$-$C_3$ alkylsulfonyl;

$R^{13}$ is $C_1$-$C_4$ alkyl;

$R^{14}$ is selected from the group consisting of allyl, propargyl, oxetan-3-yl and $C_1$-$C_3$ alkyl optionally substituted by at least one member independently selected from halogen, $C_1$-$C_2$ alkoxy and CN;

$R^{15}$ is H, $C_1$-$C_3$ alkyl or $C_1$-$C_2$ alkoxy;

$R^{16}$ is $C_1$-$C_2$ alkyl;

$R^{17}$ is H, $C_1$-$C_3$ alkyl, $C_1$-$C_2$ alkoxy, allyl or cyclopropyl;

$R^{18}$ is H or $C_1$-$C_3$ alkyl;

$R^{19}$ is $C_1$-$C_3$ alkyl, $C_1$-$C_3$ haloalkyl, allyl or propargyl;

$R^{20}$ is $C_1$-$C_4$ alkyl, $C_1$-$C_4$ haloalkyl or $C_3$-$C_5$ cycloalkyl optionally substituted by halogen;

n is 0, 1 or 2;

L is

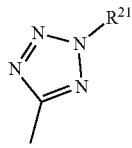

$L^1$ is $CH_2$, NH or O;

$R^{21}$ is selected from the group H and $C_1$-$C_3$ alkyl;

X is selected from the group H, $C_1$-$C_4$ alkyl, $C_1$-$C_4$ alkoxy, $C_1$-$C_4$ haloalkoxy, $C_1$-$C_4$ haloalkyl, $C_1$-$C_4$ haloalkylthio, $C_1$-$C_4$ alkylthio, halogen, $C_2$-$C_5$ alkoxyalkyl, $C_2$-$C_5$ alkoxyalkoxy, amino, $C_1$-$C_3$ alkylamino and di($C_1$-$C_3$ alkyl)amino;

Y is selected from the group H, $C_1$-$C_4$ alkyl, $C_1$-$C_4$ alkoxy, $C_1$-$C_4$ haloalkoxy, $C_1$-$C_4$ alkylthio, $C_1$-$C_4$ haloalkylthio, $C_2$-$C_5$ alkoxyalkyl, $C_2$-$C_5$ alkoxyalkoxy, amino, $C_1$-$C_3$ alkylamino, di($C_1$-$C_3$ alkyl)amino, $C_3$-$C_4$ alkenyloxy, $C_3$-$C_4$ alkynyloxy, $C_2$-$C_5$ alkylthioalkyl, $C_2$-$C_5$ alkylsulfinylalkyl, $C_2$-$C_5$ alkylsulfonylalkyl, $C_1$-$C_4$ haloalkyl, $C_2$-$C_4$ alkynyl, $C_8$-$C_5$ cycloalkyl, azido and cyano; and Z is selected from the group CH and N;

provided that (i) when one or both of X and Y is Cl haloalkoxy, then Z is CH; and (ii) when X is halogen, then Z is CH and Y is $OCH_3$, $OCH_2CH_3$, $N(OCH_3)CH_3$, $NHCH_3$, $N(CH_3)_2$ or $CF_2H$.

9. The oil dispersion according to claim 8, wherein X is selected from the group $C_1$-$C_4$ alkyl, $C_1$-$C_4$ alkoxy, $C_1$-$C_4$ haloalkoxy, halogen, di($C_1$-$C_3$ alkyl) amino and Y is selected from the group $C_1$-$C_4$ alkyl, $C_1$-$C_4$ alkoxy, and $C_1$-$C_4$ haloalkoxy.

10. The oil dispersion according to claim 9, wherein X is selected from $CH_3$, $OCH_3$, Cl, $OCHF_2$, and $N(CH_3)_2$ and Y is selected from $CH_3$, $OCH_3$, $OCHF_2$ and $OCH_2CF_3$.

11. The oil dispersion according to claim 8, wherein J is J-1, $R^1$ is Cl, $CO_2CH_3$, $CO_2C_2H_5$, $CH_2CH_2CF_3$, or $OCH_2CH_2Cl$, and $R^2$ is H; J is J-1, $R^1$ is $CO_2CH_3$, and $R^2$ is $CH_3$; J is J-2, $R^3$ is $CO_2C_2H_5$, $OCH_2CH_3$, or $COC_3$-cycloalkyl, $L^1$ is $CH_2$, O, or NH, and $R^2$ is H; J is J-5, $R^4$ is $CO_2CH_3$, and $R^5$ is H; J is J-6, $R^6$ is $CON(CH_3)_2$, $SO_2CH_2CH_3$, or $CF_3$, and $R^7$ is H; J is J-10, $R^8$ is $CH_3$, $R^9$ is $CO_2CH_3$ and $R^{10}$ is Cl.

12. A method for controlling weeds, where in the method comprises applying a oil dispersion according claim 1 or a water dilution of the oil dispersion to weed foliage and/or soil.

* * * * *